United States Patent [19]

Hirosawa et al.

[11] Patent Number: 5,557,736

[45] Date of Patent: *Sep. 17, 1996

[54] COMPUTER SYSTEM AND JOB TRANSFER METHOD USING ELECTRONIC MAIL SYSTEM

[75] Inventors: Toshio Hirosawa, Machida; Tsutomu Itoh, Kanagawa-ken; Motohide Kokunishi, Kokubunji; Atsushi Ueoka, Hachioji; Yoshikazu Ichikawa, Fujisawa; Fujio Fujita; Tadashi Yamagishi, both of Yokohama; Masahiko Ishimaru, Fujisawa; Hideki Namba, Handano; Shigeru Sasaki, Kamakura; Michio Hirano, Chigasaki; Kaoru Kozuma, Yokosuka; Kazuyuki Nakamura, Tokyo, all of Japan

[73] Assignees: Hitachi Electronics Services Co., Ltd., Tokyo; Hitachi, Ltd., Kanagawa; Hitachi Software Engineering Co., Ltd., Tokyo, all of Japan

[*] Notice: The term of this patent shall not extend beyond the expiration date of Pat. No. 5,481,698.

[21] Appl. No.: 184,069

[22] Filed: Jan. 21, 1994

Related U.S. Application Data

[63] Continuation-in-part of Ser. No. 31,729, Mar. 15, 1993, and Ser. No. 149,553, Nov. 9, 1993.

[30] Foreign Application Priority Data

| Mar. 19, 1992 | [JP] | Japan | 4-063060 |
| Nov. 11, 1992 | [JP] | Japan | 4-300775 |
| Jan. 20, 1993 | [JP] | Japan | 5-007071 |

[51] Int. Cl.$^6$ ................................ G06F 15/00
[52] U.S. Cl. .................. 395/182.02; 395/185.09; 395/185.1; 395/183.17
[58] Field of Search .................. 395/575, 600, 395/625, 185.09, 185.1, 183.17, 182.02, 182.03

[56] References Cited

U.S. PATENT DOCUMENTS

| 4,992,940 | 2/1991 | Dworkin | 364/401 |
| 5,220,501 | 6/1993 | Lawlor et al. | 364/408 |
| 5,247,575 | 9/1993 | Sprague et al. | 380/9 |
| 5,256,056 | 11/1993 | Turtle | 395/600 |
| 5,379,421 | 1/1995 | Palazzi, III et al. | 395/600 |

FOREIGN PATENT DOCUMENTS

| 64-67672 | 3/1989 | Japan . |
| 1-108830 | 4/1989 | Japan . |
| 1-267758 | 10/1989 | Japan . |

OTHER PUBLICATIONS

Lexis/Nexis Keyboard Sheet (1992).
Learning Lexis: A Handbook for Modern Legal Research, Mead Data Central (1991).
Notes on Printing and Storing to Disk, Mead Data Central, 1991.
Westlaw Database List, West Publishing, 1994.

*Primary Examiner*—Robert W. Beausoliel, Jr.
*Assistant Examiner*—Alan M. Fisch
*Attorney, Agent, or Firm*—Fay, Sharpe, Beall, Fagan, Minnich & McKee

[57] ABSTRACT

In an electronic mail associated type computer system network equipped with a computer system for executing a job and a general-purpose electronic mail system, a user of an electronic mail can freely recognize a condition of an execution result of a job performed in the computer system and a job execution result. Also, these results are available from a desired output device for the user. When a mail processing unit employed in the computer system analyzes a mail statement about the job execution derived from the electronic mail system, and the job execution is completed, this mail processing unit sends to the electronic mail system, such a mail statement for the completion of the job execution containing information about fail/safe execution result. Upon receipt of this report, the user designates the output device into a response mail so as to output the job execution result from the designated output device.

44 Claims, 16 Drawing Sheets

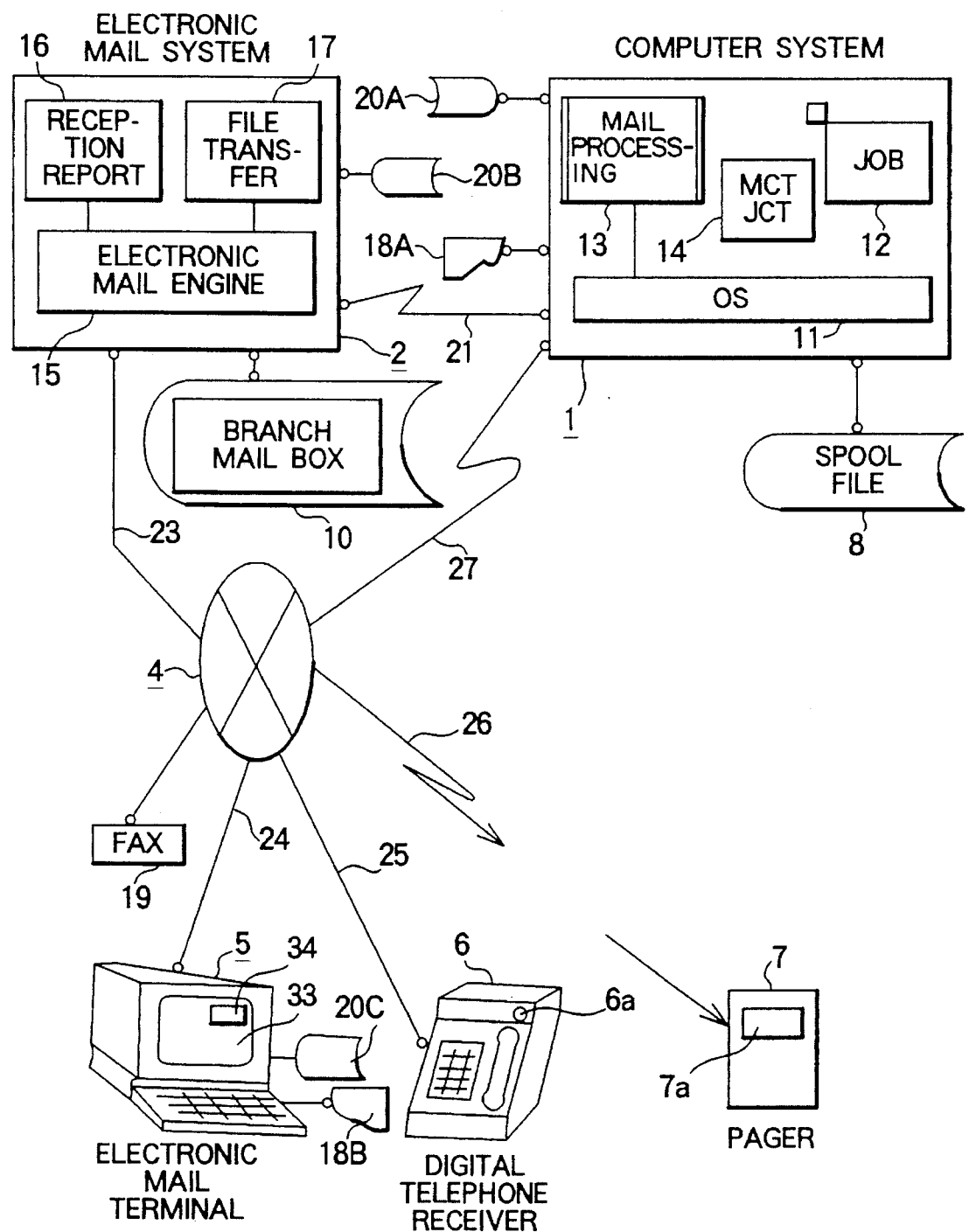

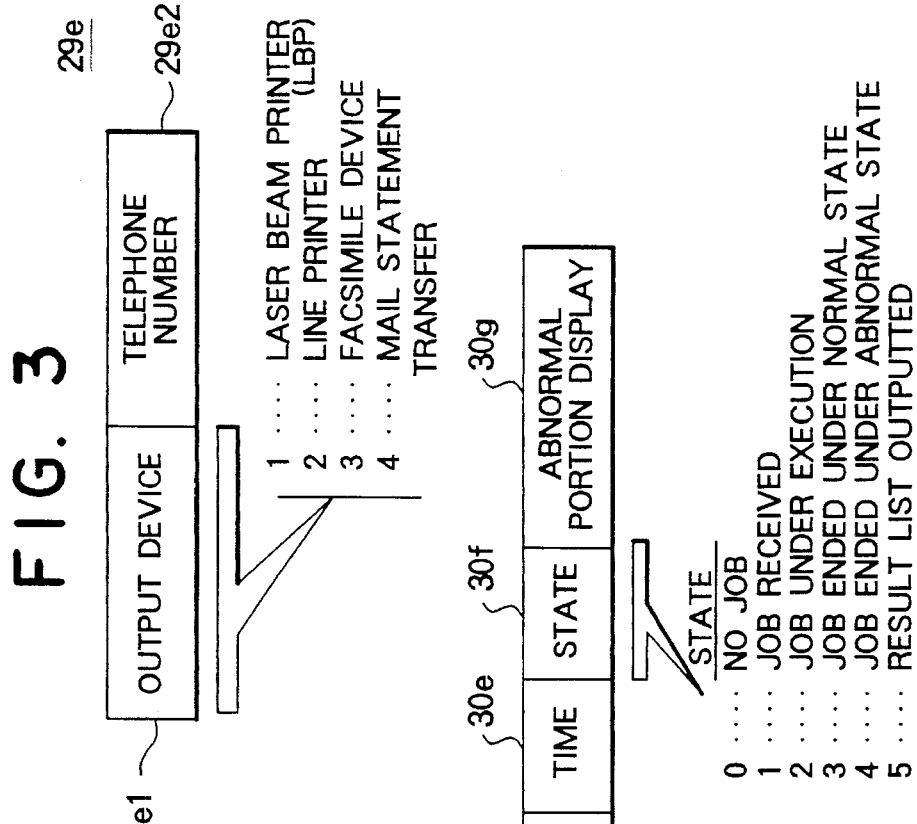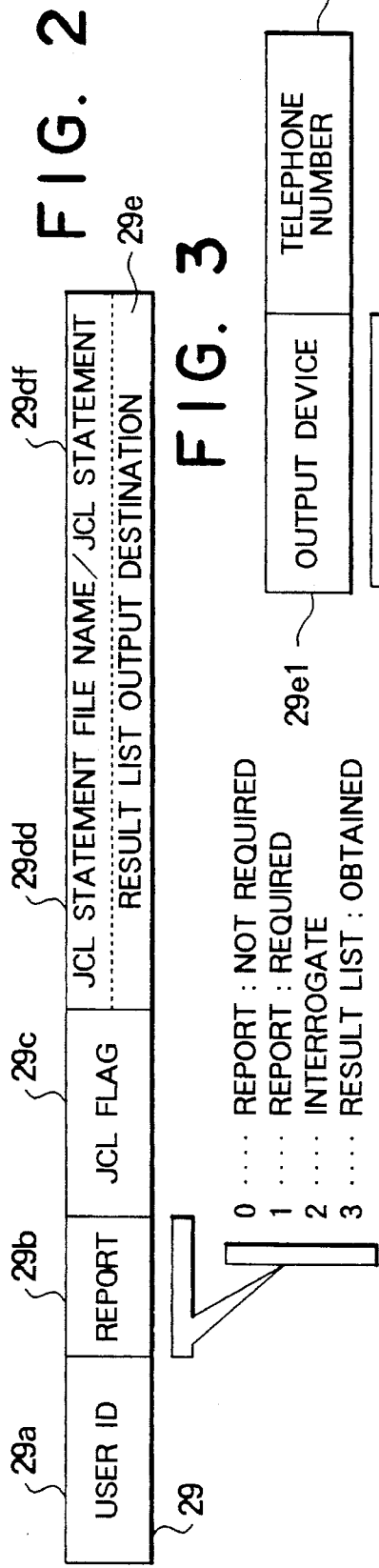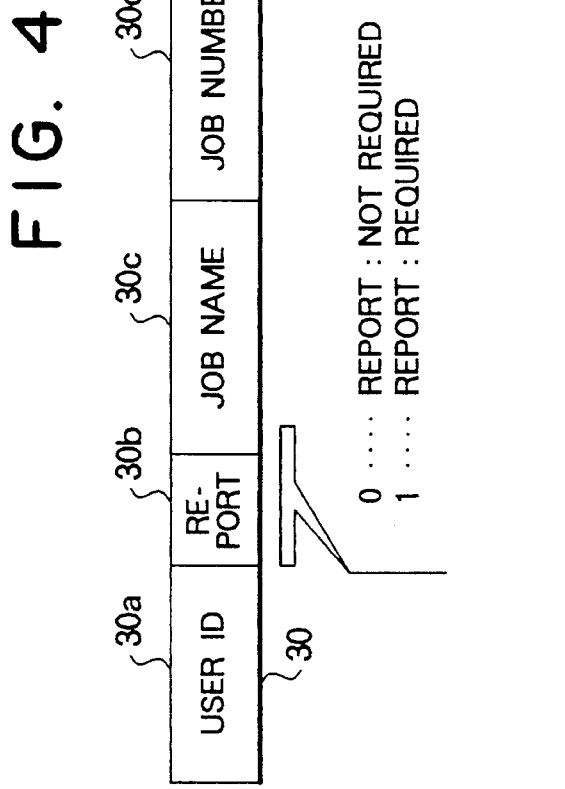

FIG. 6

39 MCT

| RE-PORT | USER ID | COMPUTER SYSTEM USER ID | JOB ISSUING NUMBER | JOB ENDING NUMBER | JCT ADDRESS |
|---|---|---|---|---|---|
| ⋮ | ⋮ | ⋮ | | | ⋮ |
| | | | | | |

39a, 39b, 39c, 39d, 39e, 39f

40 JCT

| JOB TITLE | JOB NUMBER | TIME | STATE | ABNORMAL PORTION |
|---|---|---|---|---|
| ⋮ | ⋮ | | ⋮ | |
| | | | | |

40a, 40b, 40c, 40d, 40e

F I G. 13
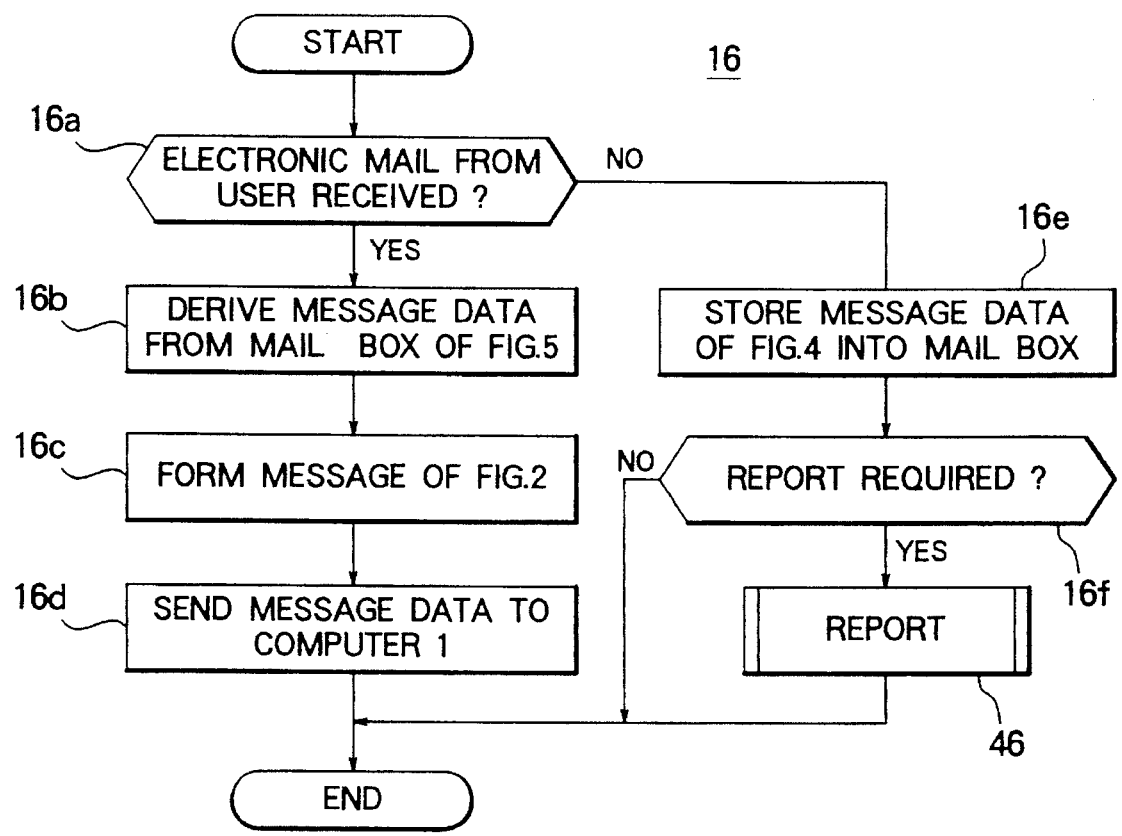

COMPUTER SYSTEM AND JOB TRANSFER METHOD USING ELECTRONIC MAIL SYSTEM

CROSS-REFERENCES TO THE RELATED APPLICATIONS

This is a continuation-in-part application of U.S. Ser. No. 08/031,729 filed on Mar. 15, 1993 and U.S. Ser. No. 08/149,553 filed on Nov. 9, 1993 based on Japanese Patent Application No. 4-300775 filed on Nov. 11, 1992 and assigned to the assignees of the present application. The disclosures of these applications are herein incorporated by reference.

BACKGROUND OF THE INVENTION

The present invention relates to a computer system for executing a job by utilizing an electronic mail system, and also to a method for outputting/reporting a job execution condition and a job execution result in an electronic mail system.

Various methods for utilizing computer systems employing electronic mail have been proposed as follows: (1) a job execution result is asked by electronic mail on a host computer and registered in a mail box of a distribution destination, as disclosed in JP-A-1-108830; (2) a job execution is requested for a host manager by electronic mail so that an execution for a host manager by electronic mail so that an execution result mail is distributed by a host computer, as disclosed in JP-A-64-67672; and (3) the execution of a job and the distribution of the execution result are requested for a host computer by electronic mail through an electronic mail system independent of the host computer, as disclosed in JP-A-1-267758.

It is, of course, desired to provide an optimum method for utilizing the computer system in conjunction with the electronic mail as the information communicating means, in which the job is executed in the computer system with employment of the electronic mail, and the job execution result is obtained by utilizing again the electronic mail.

For instance, when the job executed under control of the computer system is accomplished, it is desirable to output the job execution result on such an output device in accordance with an arbitrary method for outputting a job-execution-completion report and a job execution result requested by the user. This output device owns various factors such as place, timing, and output quality, which are required by the user of the electronic mail system.

Otherwise, in view of standpoints of users, it is preferable for them to grasp the execution conditions of the job requested by them at any time and any place. In other words, there are some possibilities that the users do not always want to obtain the job execution results, but immediately wish to recognize the job execution conditions, or whether or not the job execution is completed under normal condition. Then, after the users confirm such a normal end of the job execution, they will try to obtain the job execution result.

On the other hand, taking account of the system, a large amount of data transfer operation is required in order to distribute the job execution results in the computer system, which is greatly different from the general-purpose electronic mail system. A memory capacity to store a single job execution result is on average. Therefore, it is desirable to realize such an electronic mail system that no excessive loads are given to the entire system while the above-explained large amounts of data are processed, and furthermore no specific utilization restrictions are given to a large number of users of the electronic mail system.

In view of this consideration, none of the above-referenced prior art could disclose and/or teach how to satisfy both conditions, namely, convenience for the users of the electronic mail system, and reduction in loads given to the electronic mail system.

SUMMARY OF THE INVENTION

An object of the present invention is to provide an electronic mail system and a control method thereof, capable of correctly performing a mail communication without giving large loads on a communication device and a memory even when a plurality of job execution requests/requests to output job execution results are issued with respect to a computer system where the job is executed.

Another object of the present invention is to provide a processing method and a processing apparatus, capable of outputting execution results of a job executed in a computer system to a specific output device designated by a user who has selected it from various output devices in accordance with contents of the job execution results.

A further object of the present invention is to provide an electronic mail system, a control method thereof, and also a control apparatus thereof, capable of freely grasping either a job execution condition, or a job-execution-end condition by a user when the job is executed by the computer system by utilizing an electronic mail.

An electronic mail associated type computer system, according to one aspect of the present invention, is comprised of a computer system for executing a job, an electronic mail system coupled to the computer system, for controlling to deliver/receive a mail and the like, and electronic mail terminals as well as various output devices. A job is requested from the electronic mail terminal via the electronic mail system to the computer system. A job processing condition and a job-processing-end condition are transmitted from the computer system via the electronic mail system to the electronic terminal. When the job execution is completed, a job execution result is once stored in a memory device employed in the computer system.

In response to an output requesting mail statement for obtaining the job execution result issued from the electronic mail system, the job execution result stored in the memory device of the computer system is transferred, or outputted to a request issuer.

In accordance with the above-described feature of the present invention, the computer system is comprised of a processing means capable of independently receiving the job execution result from the user of the electronic mail system. This may be realized in such a manner that the output processing means of the job execution result will separately function in response to the request made from the mail statement. The destination to output the job execution result is designated in this mail statement. For instance, there are designated output devices such as a printer and a facsimile device, which are connected to the computer system, or a facsimile device connected to a public telephone network, and printer/file devices connected to the electronic mail terminal device.

A computer system, according to a second aspect of the present invention, is comprised of a processing means for processing interrogation about a job execution condition issued from a user of an electronic mail system. After the job execution condition is investigated on the side of the computer system, the check result is again returned to the user as a mail.

In another computer system according to a third aspect of the present invention, a monitor apparatus is interposed between a computer system and an electronic mail system. In other words, the monitor apparatus of the computer system has a function of the electronic mail system. This computer system reports the conditions of the job execution and the execution end to this monitor apparatus. As a consequence, all of the mail exchanges are performed by this monitor apparatus with respect to the electronic mail system.

In accordance with the electronic mail associated type computer system of the first feature of the present invention, the user can designate the optimum output device, depending upon the content of the job, to output the job execution result on this output device.

Also, in accordance with the second feature of the present invention, after the interrogation about the job execution issued from the electronic mail terminal is once accepted as the mail by the electronic mail system, this interrogation is sent as the interrogation mail to the computer system. Both the computer system and the monitor apparatus are comprised of processing means for recognizing the interrogation mail and for immediately returning the job execution condition. Then, the user of this electronic mail terminal can directly investigate the job execution conditions by way of the electronic mail terminal in real time without employing such an exclusive line as a TSS line among the electronic mail terminals and the computer system. A report about such a fact that the job execution in the computer system is completed, and the condition when the job execution is completed, is transferred to the user of the electronic mail system. As a result, the user can judge whether or not the job execution is accomplished under normal condition, namely whether or not the job execution result should be obtained. When the user judges that the job execution result should be obtained, this user sends the mail statement to obtain the list of the job execution results. In response to this mail statement, the job execution result is transferred, or outputted from the computer system to either the electronic mail terminal or the desired output device. As previously described, according to the present invention, the communication with only a small capacity of mail statement is established under normal condition, so that a total number of transfer operations for the job execution results within the system in connection with a large amount of data may be reduced. That is, only the job execution result which is truly required by the user is outputted to a predetermined or pre-designated output device.

In accordance with the above-explained third feature of the present invention, since the monitor apparatus can be interposed between the computer system and the electronic mail system, after the report about the job execution completion on the side of the computer system is issued to the monitor apparatus, the mail exchange is performed between the monitor apparatus and the electronic mail system even when the operation of the computer system is interrupted. As a consequence, it is always possible to report that the job execution is completed.

BRIEF DESCRIPTION OF THE DRAWINGS

FIG. 1 schematically illustrates an arrangement of an electronic mail associated type computer system according to a first embodiment of the present invention;

FIG. 2 represents one format of a job execution proposing mail statement in the computer system of FIG. 1;

FIG. 3 schematically shows in detail an output destination of a result list of FIG. 2;

FIG. 4 indicates one format of a mail statement sent from the computer system of FIG. 1.

FIG. 6 schematically indicates a structure of a control table within the computer system of FIG. 1;

FIG. 13 is a flow chart for explaining a processing operation of a reception report program for the electronic mail system of FIG, 1;

DESCRIPTION OF THE PREFERRED EMBODIMENTS

Figure 5:
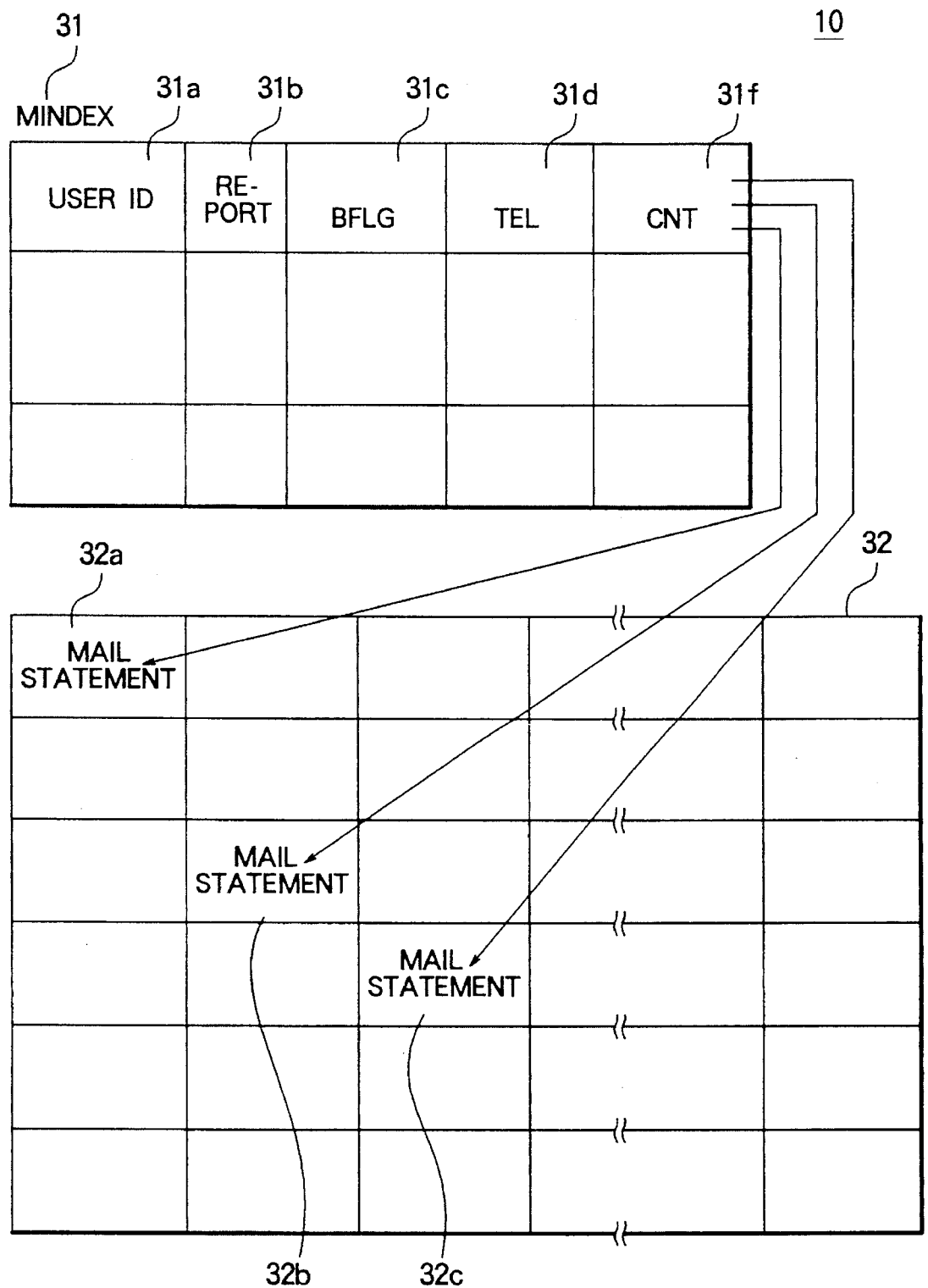
FIG. 5 schematically shows a structure of a mail box within the electronic mail system of FIG. 1.

Referring now to FIGS. 1 to 6, an electronic mail associated type computer system according to a first embodiment of the present invention will be described.

FIG. 1 schematically represents an arrangement reflecting a first feature of the electronic mail associated type computer system according to the present invention. In FIG. 1, reference numeral 1 indicates a computer system for executing a job, and reference numeral 2 denotes an electronic mail system connected via a public telephone network 4 to the computer system 1. Reference numeral 5 shows a group of plural electronic mail terminals. Reference numeral 6 indicates a telephone receiver, and reference numeral 7 indicates a pager or beeper. Reference numeral 8 represents a spool file for storing a group of jobs to be executed by the computer system and also for storing results obtained by executing the job. Also, reference numeral 10 shows a file for storing a mail box provided in the electronic mail system, reference numerals 18A and 18B indicate printer apparatuses such as a line printer (LP) and a laser beam printer (LBP). Reference numeral 19 is a FAX (facsimile), and reference numeral 20A shows a file for temporarily storing a list of job execution results derived from the spool file 8. The above-described components are coupled either via the public telephone network 4, or directly to the computer system 1.

The computer system 1 includes a CPU (central processing unit) and a memory. The memory stores a job 12 and a mail processing program 13, executed under an operating system (OS), and control tables (MCT: Mail Control Table, and JCT 3 Job Control Table) 14.

On the other hand, under the electronic mail system 2, an electronic mail engine 15 for realizing an electronic mail function, a program 16 for processing a job reception report, and a file transfer processing program 17 for transferring a mail statement and a job execution result list are operated. Further, reference numeral 20B shows a file connected to a main body of the electronic mail system, and reference numeral 20C indicates a file connected to the electronic mail terminal 5.

The computer system 1 is connected via an exclusive line or dedicated line 21 to the electronic mail system 2. The electronic mail terminal 5 is connected via lines 24, 4, 23 to the electronic mail system 2. Alternatively, the electronic mail terminal 5 may be directly connected via the exclusive line, but not via the public telephone network 4 to the electronic mail system. In a display screen 33 of the electronic mail system 2, there is provided a specific region 34 used to display an arrival (deposit) of an electronic mail. Similarly, the telephone receiver 6 contains a lamp 6a and the pager 7 contains a display unit 7a, which are connected via the line 25 or 26 to the public telephone network 4.

It should be noted that even when there are provided plural electronic mail systems having similar functions, no adverse influence is given to their operations. In such a case that a plurality of electronic mail systems are employed, a mail processing unit 13 within the computer system may properly distribute a mail statement. Although the following description concerns such a case that only a single electronic mail system is provided, the following description may also concern another case that a plurality of electronic mail systems are provided, if necessary.

A user requests the electronic mail system 2 via the electronic mail terminal 5 to execute a job by the computer system 1. After this request is once stored in the mail box 10 under control of the reception report processing program 16 of the electronic mail system 2, the job request statement is transferred via the line 21 to the computer system 1 by utilizing the file transfer processing program 17.

It should also be noted that a detailed operation about the job request method by utilizing the electronic mail system is described in U.S. patent application Ser. No. 08/031,729 assigned to the same assignees (corresponding to Japanese Patent Application No. 4-63060 filed on Mar. 19, 1992).

FIG. 2 schematically represents one example of a mail statement of job request. A mail statement 29 of job request is constructed of a user ID 29a of the electronic mail system 2, a report field 29b, a JCL (Job Control Language) flag 29c/JCL statement file name 29dd, a JCL statement data stream 29df, and a field 29e for designating result list output destination. Here, when the JCL flag 29c becomes "0", the data stream subsequent to this JCL flag 29c corresponds to the JCL statement file name 29d. When the data JCL flag 29c becomes "1", the data stream subsequent to this flag corresponds to the JCL statement data stream 29e. When the JCL flag 29c becomes "2", the data stream subsequent to this flag corresponds to the field for designating result list output designation.

A content of this field 29e for designating result list output designation is represented in FIG. 3. That is, this field 29e is constructed of a sort field 29e1 of an output device, and a telephone number field 29e2 in case of a facsimile output. With respect to the sort field 29e1 of the output device, as shown in FIG. 3, the below-mentioned output destinations are designated, depending upon values of this field:

(1). Laser beam Printer (LBP) directly connected to the computer system.
(2). Line printer (LP) directly connected to the computer system.
(3). Mail statement transfer.
(4). Facsimile device of the electronic mail system.
(5). Line printer of the electronic mail transfer.
.
.
.
(N). –.

The report field 29b represents a sort of request issued from a user, and values of the report field indicate the following meanings:

(1). When the value becomes "0", no report is required.
(2). When the value becomes "1", a report is required.
(3). When the value becomes "2", a job execution condition is interrogated.
(4). When the value becomes "3", a list of job execution results is required.

FIG. 4 represents one format of the job execution state mail statement 30 from the computer system 1. In FIG. 4, this job execution state mail statement 30 contains a user ID 30a and a report field 30b similar to that of FIG. 2. Furthermore, this mail statement 30 is arranged by a job name 30c, a job number 30d, a time field 30e, and a state field 30f related to a job of a user who uses this computer system 1. It should be understood that the time field 30e corresponds to a date and time when this mail statement is formed by the computer system 1. The state field 30f stores therein various states related to the job of the relevant user, whose values represent the following meanings:

(1). 0—no job.
(2). 1—job reception is completed
(3). 2—job under execution
(4). 3—job is completed under normal condition.
(5). 4—job is completed under abnormal condition.
(6). 5—result list is outputted.

In an abnormal portion display field 30g, detailed information about such a case that a job is completed under abnormal condition, is given. For instance, there are various cases that either all jobs are completed under abnormal condition, or the same jobs are partially executed under normal condition, and partially executed under abnormal condition. When an abnormal state partially happens to occur in a job execution, this abnormal job execution portion is specified by way of the computer system and then is displayed as a message.

FIG. 5 schematically shows an arrangement of a mail box storing file 10 of the electronic mail system 2. The mail box 10 is arranged by a mail index portion 31 and a mail statement storage unit 32. The mail index portion 31 is constructed of a user ID field 31a of the electronic mail system, a report field 31b for representing whether or not a report to a user is made; a BFLG field for indicating whether or not the relevant user is now active; a user's telephone number 31d; and management information CNT31f about a storage place of a mail statement. The mail statement storage unit 32 may store therein a plurality of mail statements 32a, 32b, and 32c.

Referring back to FIG. 1, upon receipt of the job request mail statement 29 shown in FIG. 2, the mail processing program 13 employed within the computer system 1 interprets this message data to request the OS11 to execute the job. This is performed by storing the data stream of the job execution in the spool file 8. Under control of the OS11, the job stream stored in the spool file 8 is sequentially read out and then executed as a job 12. When the execution of the job is completed, the execution result is again stored in the spool file 8, and thereafter the control operation is transferred to the mail processing portion 13.

The mail processing program 13 produces the job execution state mail statement 30. At this time, the value of the report flag 30b (see FIG. 4) is determined based on the value of the report flag 29b (see FIG. 2). Subsequently, the job execution state mail statement 30 is returned to the electronic mail system 2. The above-described processing operation is carried out by utilizing the control tables MCT and JCT 14. It should be noted that a detailed operation of the control tables MCT and JCT 14 will be explained with reference to FIG. 6.

Upon receipt of the job execution state mail statement 30, the electronic mail system 2 stores this mail statement in the mail box 10 shown in FIG. 5. This communication is made via either the exclusive line 21, or the public telephone line 23. Next, the content of the report flag 30b is checked. If the report is required (namely, the value of the report flag 30b becomes "1"), the electronic mail system 2 tries to make a report to a user of this electronic mail. When this user is under active state (the value of BFLG of FIG. 5 becomes "1"), an arrival of this electronic mail is represented in the specific region 34 of the screen 33 of this electronic mail terminal 5. At this time, not only the arrival of the electronic mail is displayed, but also the information about job completion is represented as shown in FIG. 4. Specifically, this job completion information contains a job name, a completion state, and a completion time.

On the other hand, when the user of the electronic mail terminal is not under active (namely, BFLG=0), the lamp 6a of the telephone receiver 6 is flickered, and the end state of job execution is displayed on the display unit 7a of the pager 7. Alternatively, a report of completion of job execution may be represented on the facsimile device 19. When such a report is made to the pager 7 and the facsimile device 19, various information such as the job name, end state, and end time is displayed on the display unit 7a of the pager 7, or printed on the paper of the facsimile device 19. It should be understood that when a telephone call, or a facsimile line is established via the public telephone network 4, the telephone number TEL 31d within MINDEX 31 of FIG. 5 is utilized.

Subsequently, the user of this electronic mail system requests a list of job execution results by way of the electronic mail terminal 5. This is performed by that the value of the report flag 29b shown in FIG. 2 becomes 3, and the output destination is designated in the result list output designation field 29e. In the result list output designation field 29e, the output device of FIG. 3 may be designated. When this job request mail statement 29 is delivered to the computer system 1, the mail processing unit 13 derives the job result list of this user from the spool file 8, and outputs the job result list to the designated output advice. In other words, the mail processing unit 13 outputs this job result list to an LBP when such output devices as the LBP18A and the printer 18B are designated, the LBP18A is directly connected to the computer system, and the printer 18B is provided on the side of the electronic mail system. This job result list is outputted to a file when the file device 20B is designated, or is printed out when the facsimile device 19 is designated and the telephone number 29e2 thereof is dialed.

FIG. 6 schematically shows a structure of the control tables MCT and JCT indicated in FIG. 1. In FIG. 6, reference numeral 29 indicates a main control table (MCT), and reference numeral 40 shows a job control table (JCT). The MCT 39 includes a report field 39a for indicating whether or not a report is issued to a user of the electronic mail; a user ID field 39c of the computer system; a job issuing number field 39d of this user; a job ending number field 39e; and address information 39f to JCT. The JCT 40 is includes a job name (title) field 40a; a job number field 40b; a time field 40c; a job state field 40d; and an abnormal portion display field 40e.

Figure 7:
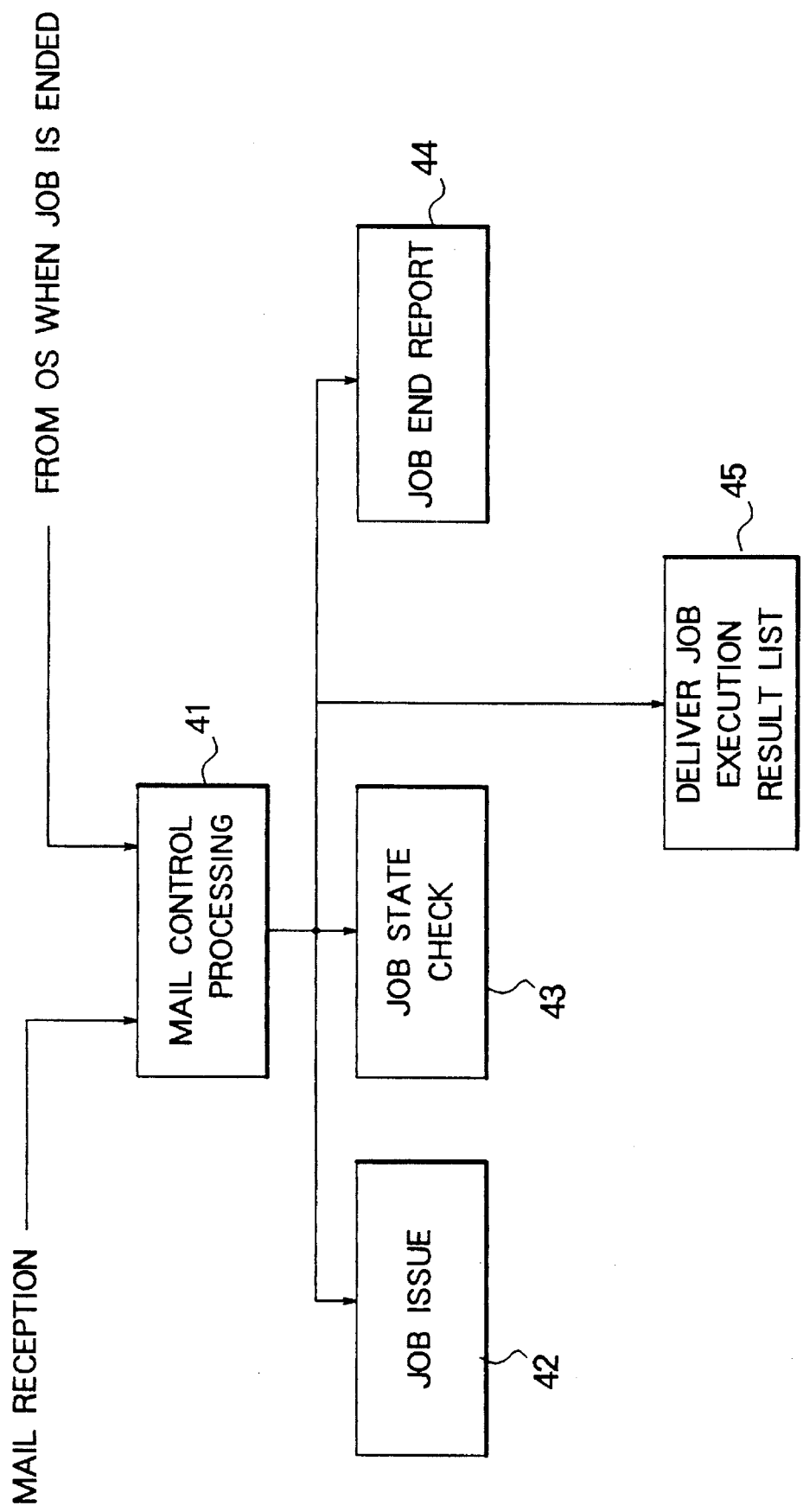
FIG. 7 schematically represents a structure of a mail processing program within the computer system of FIG. 1.

Referring now to FIG. 7, a description will be made that the control operation by the mail processing program 13 is transferred between two cases, i.e., when an electronic mail is received, and when a job execution is completed. In response to a content of a request, the mail control processing main unit 41 selects the proper control operation for the corresponding processing programs 42 to 45.

Figure 8:
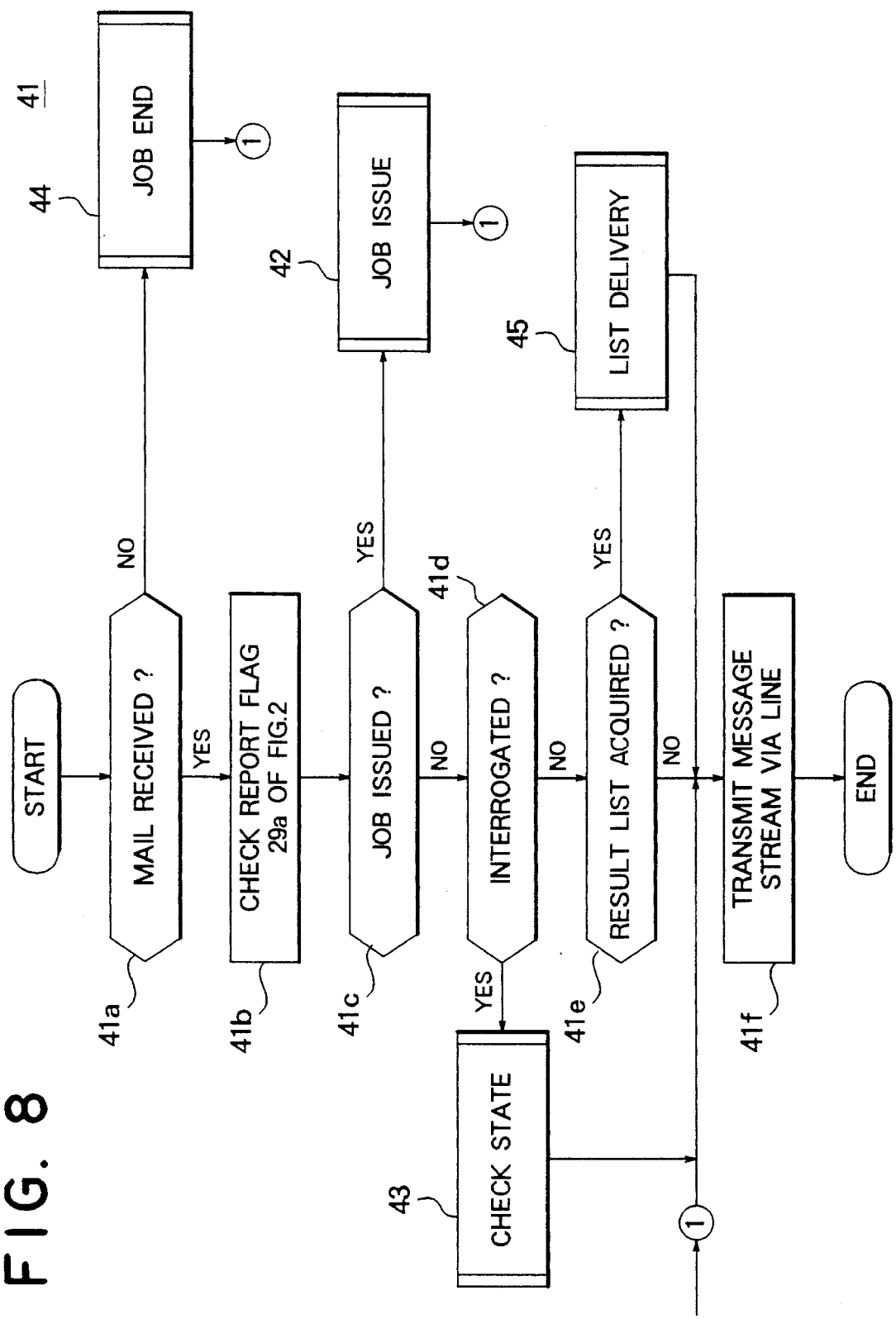
FIG. 8 is a flow chart for explaining a processing operation of a mail control processing program of FIG. 7.

FIG. 8 is a flow chart for representing a processing operation of the mail control processing main unit 41. In this flow chart, a check is done as to whether an electronic mail is received, or a job execution is completed at a processing step 41a. This check result is determined based on a fact that where the control operation has been accomplished. If the job execution is completed, then the control operation is transferred to the job end processing program 44. If the job request mail 29 is received, then processing operations defined after the processing step 41b are executed. At the processing step 41b, a check is made of the report flag 29b shown in FIG. 2. As a result of this check, when the job issue is requested, namely the value of the report flag 29a is either "0", or "1", at the processing step 41c, the job issue processing program 42 is called.

At a judgement processing step 41d, a check is done as to whether or not an interrogation is made (namely, the value of the report flag 29a becomes "2"). If the interrogation is issued, then the state check processing program 43 is called. Next, another check is made at a judgement processing step 41e as to whether or not a result list of job execution is required (namely, the value of the report flag 29a becomes "3"). At this time, the list delivery processing program 45 is called. When these processing operations are accomplished, the mail statement 30 of the job execution state shown in FIG. 4 is transmitted via the line at a processing step 41f. It should be noted that the processing operation of the list delivery processing program 45 will be explained more in detail with reference to FIG. 12.

Figure 9:
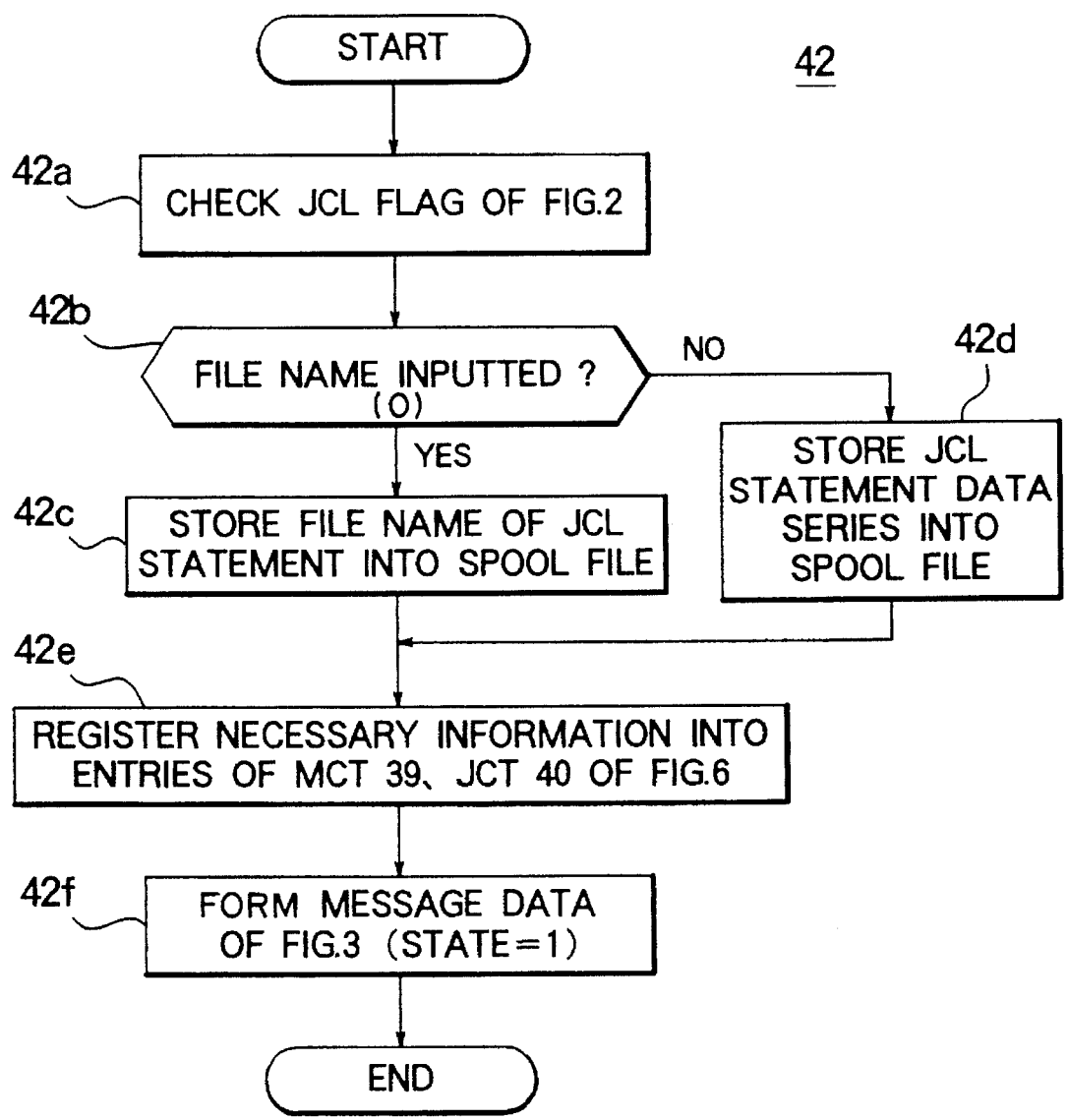
FIG. 9 is a flow chart for explaining a processing operation of a job execution processing program of FIG. 7.

FIG. 9 shows a processing flow of the job issue processing program 42. At a first processing step 42a, the value of the JCL flag 29c shown in FIG. 2 is investigated. At the next judgement processing step 42b, when a judgement is made that the file name is inputted (namely, the value of this JCL flag 29c is "0"), the file name 29dd of the JCL (Job Control Language) statement shown in FIG. 2 is stored into the spool file 8 at a processing step 42c. On the other hand, when the file name is not entered, the JCL statement data stream 29df is directly stored into the spool file 8 at a processing step 42d. As a result, this data stream 29df will be executed as a job 12 under control of OS11 later.

At a further processing step 42e, the respective entries of MCT39 and JCT40 shown in FIG. 6 are completed. In other words, the below-mentioned processing operations are executed:

(1). Discrimination between "report required" and "report not required" is made in the report flag 39a.

(2). The electronic mail user ID 30b is stored.

(3). The user ID 39c is stored at the computer system.

(4). The job issuing number of this user is set.

(5). The job ending number of this user is set.

Furthermore, the following processing operations are carried out within JCT 40:

(6). Both the job name 40a and the job number 40b are stored.

(7). The job receiving time 40c is stored.

(8). The value of the state field 40d is set to the job reception (0).

It should be noted that the values of the state field 40d have the same meanings as the state field 30f. At the subsequent processing step 42f, message data used to the mail statement 30 shown in FIG. 3 is formed (the value of the state field 30f becomes "1"), and the control operation is returned to the mail control processing program 41.

Figure 10:
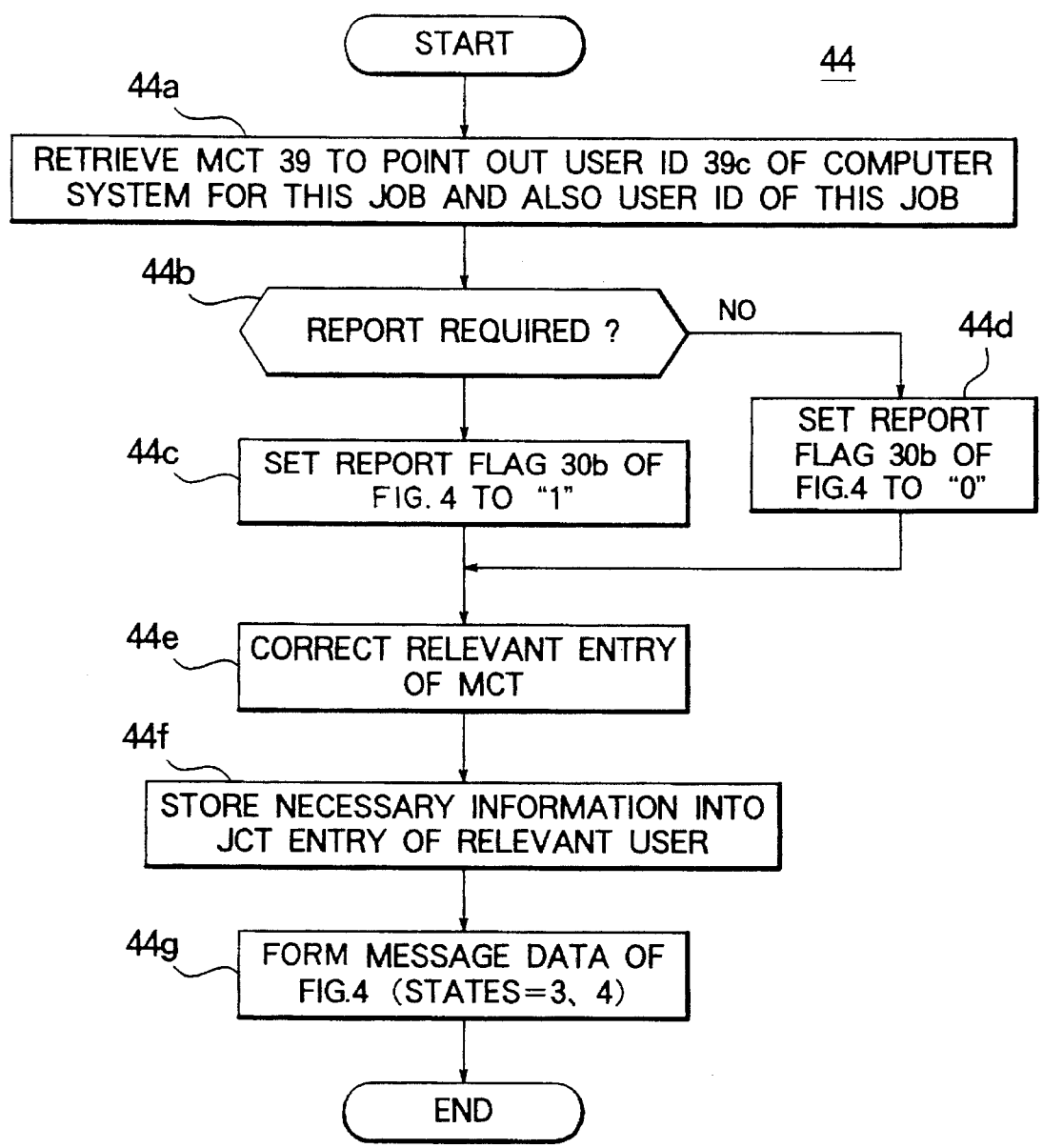
FIG. 10 is a flow chart for explaining a processing operation of a job execution completion announcement of FIG. 7.

FIG. 10 indicates a processing flow of the job and processing program 44. At a processing step 44a, MCT 39 is retrieved, and an entry equivalent to the computer system user ID for the ended job is located. At the next judgement processing step 44b, the report flag 39a of the entry located at the previous step is checked to investigate whether or not the report request is made. When the report request is issued, the value of the report flag 30b shown in FIG. 4 is set to "1" at a processing step 44c. On the other hand, when no report request is issued, the value of the report flag 30b is set to "0" at a processing step 44d.

At the next processing step 44e, the values of the respective fields of the relevant entry of MCT39 are corrected. In this case, the job ending number 39e is incremented by 1. At a processing step 44f, the entry of JCT40 is corrected. Specifically, the value of the time field 40c is corrected as the execution end time of this job, and also the value of the state field 40d is corrected. In this case, the value of the state field 40d is set to "3" if this job has been executed under normal condition, whereas the value of the state field 40d is set to "4" if this job has been executed under abnormal condition. In case of such an abnormal job execution, information indicative of the abnormal portion is entered into the abnormal portion display field 40e. At a processing step 44g, the mail statement 30 containing the message data shown in FIG. 4 is formed, and then the control operation is returned to the mail control processing program 41.

A user may investigate execution conditions of a job either under execution, or completely executed in the computer system 1 by employing the electronic mail terminal 5.

Figure 11:
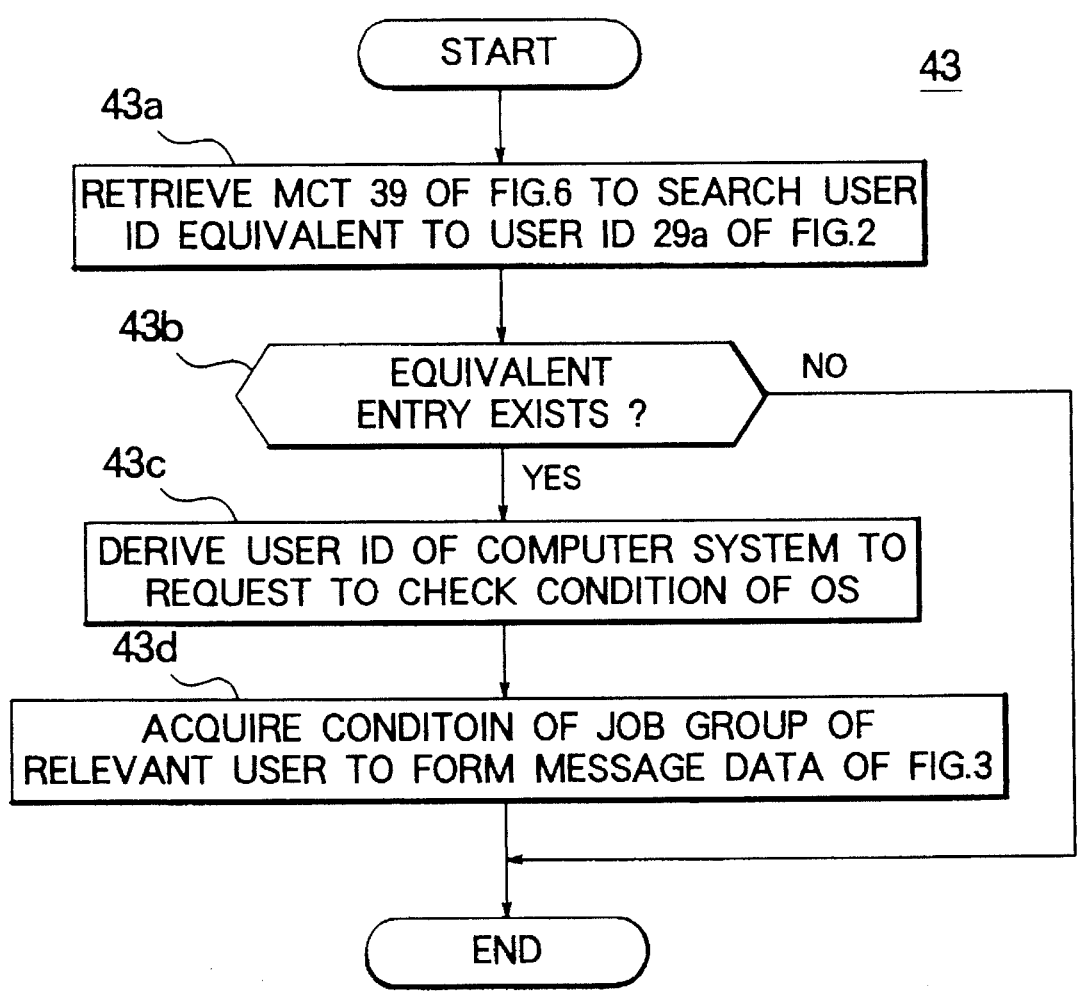
FIG. 11 is a flow chart for explaining a processing operate of a job state checking program.

FIG. 11 is a processing flow of the job-state checking processing program 43 indicated in FIG. 7. The processing program 43 is initiated when interrogation is issued from a user of an electronic mail. At this time, the value of the report field 29b of the job request mail statement 29 is set to "2".

At a processing step 43a, a user ID 39b equivalent to the user ID 29a of the job request mail statement 29 is retrieved from MCT39. When the user ID39b equivalent to the user ID29a is not present at a judgement processing step 43b, the processing operation is accomplished. When the entry of the user ID equivalent to the user ID 29a is present, this entry is located, and a request for checking the state of the job of this user is issued to OS11 at the processing step 43c. At a processing step 43d, the mail statement 30 containing the message data represented in FIG. 4 is formed based on the state report issued from OS11. It should be understood that since this mail statement 30 corresponds to a response mail for the interrogation request, the value of the report field 30b must be "1", namely "report is required".

As previously explained, the values of the state field 30f own the following meanings:

(1). If the value of this state field 30f is 0, then there is no job for this user.

(2). If the value of this state field 30f is 1, the job is under reception.

(3). If the value of this state field 30f is 2, the job of this user is under execution.

(4). If the value of this state field 30f is 3, then the job of this user is completed under normal condition.

(5). If the value of this state field 30f is 4, then the job of this user is completed under abnormal condition.

On the state field 30g, the abnormal ends of this job, for example, over memory, time over of CPU, and operand code trap are represented. As a consequence, it is possible to recognize which portion of the relevant job becomes abnormal.

A user can judge whether or not the job execution result should be obtained based on the information about the above-explained end conditions. Even in an abnormal end, there are some possibilities that the user wishes to obtain the job execution result, depending on the contents of this abnormal end. When the user wants to obtain the job execution result, the user may send via the electronic mail terminal 5 an electronic mail statement used to obtain the list of the job execution results performed by the computer system 1. At this time, it is possible to change output destination of the list.

Figure 12:
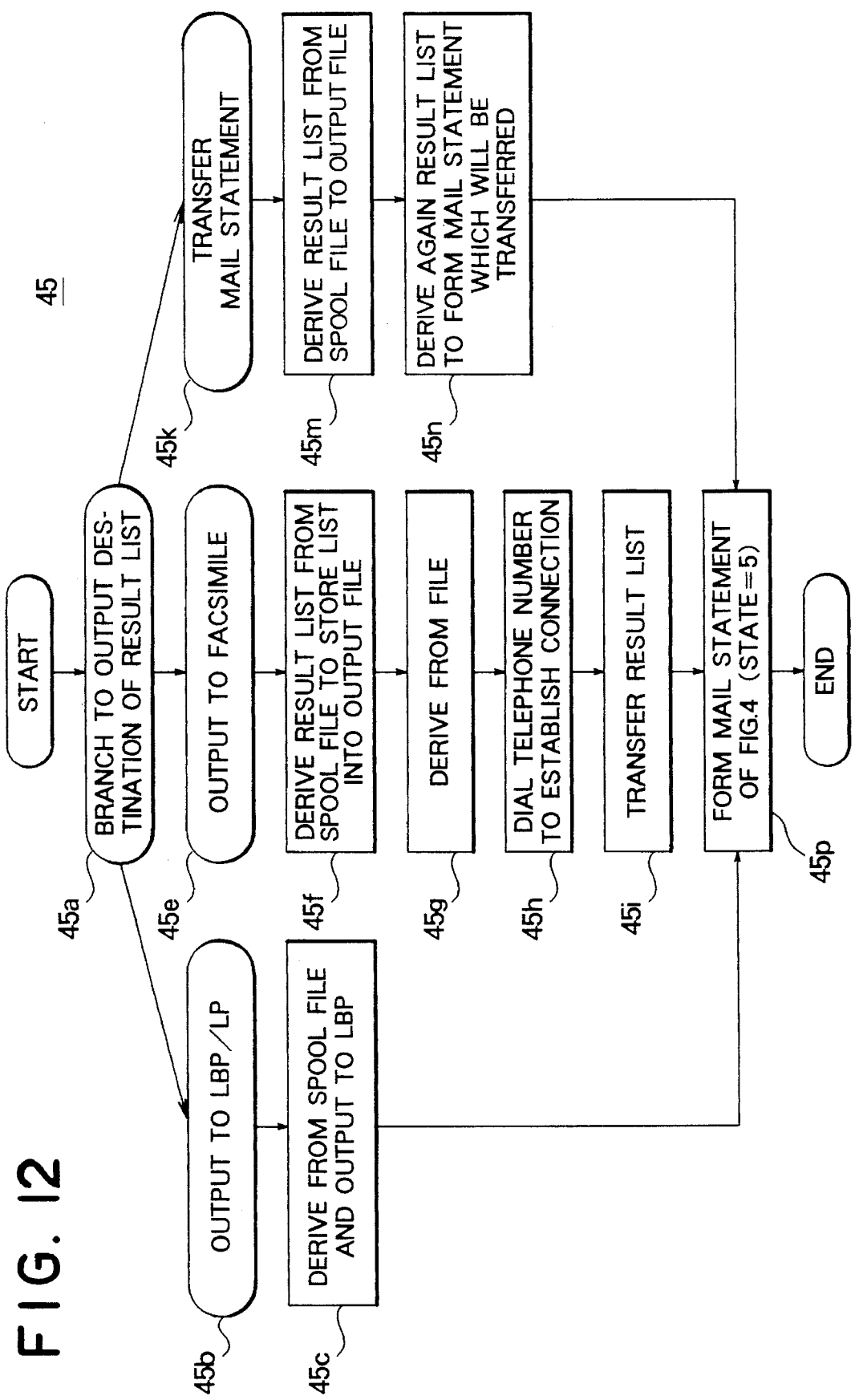
FIG. 12 is a flow chart for explaining a processing operation of a job execution result delivery program.

FIG. 12 is a flow chart for explaining a processing flow of the job-execution-result list delivery processing program 4 shown in FIG. 7. At a branch processing step 45a, the processing operation is branched, depending upon the contents designated in the output device field 29e1 for outputting the job execution results represented in FIG. 3. When the laser beam printer (LBP)/line printer (LP) 18A connected to the computer system 1 are designated as the output device, after a processing operation defined at a processing step 45c has been executed, a processing operation defined at a processing step 45p is executed. At the processing operations 45c and 45p, the job execution result of the relevant user is derived from the spool file 3, and the list of the execution results is immediately outputted to the designated output device. Next, the mail statement 30 of FIG. 4 is formed at the processing step 45p. At this time, the value of the state field 30f becomes "5" which implies "output of result list".

When the facsimile device 19 is designated as the output device for the job execution result, processing operations defined from a processing step 45f to the processing step 45i are executed, and thereafter another processing operation defined at a processing step 45p is carried out. First, at the processing step 45f, the list of the job execution results for the relevant user is derived from the spool file 8, and then is once stored into the output file 20A. Again, after the execution result list which has been previously stored at the processing step 45g, is derived from the output file 20A, the dialing operation is carried out with use of the telephone number of the telephone number field 29e2 (FIG. 3) designated at the processing step 45h, and thus a communication with the facsimile device 19 is established. At the next processing step 45i, the list of the job execution result is transferred to this facsimile device 19.

Subsequently, the job execution state mail statement 30 is formed at a processing step 45p. At this time, the value of the state field 30f becomes "5" which implies "output of result list". It should be noted that if the telephone number connected to the electronic mail terminal device 5 is designated as the value of the telephone number field 29e2 of the facsimile device, then the list of the job execution result is directly displayed on the display screen 33 of the electronic mail terminal 5.

When a demand (value of output device field 29e1 shown in FIG. 3 corresponds to "4") is issued (step 45k) to transfer the job execution result list as the mail statement 30, processing operations defined as processing steps 45m, 45n, and 45p are executed. The processing operation of the processing step 45m is identical to that of the previous processing step 45f. At the processing step 45n, the list of the job execution result for the relevant user is extracted from the output file 20A, and is transferred as the mail statement to the electronic mail system 2. Subsequently, the job execution state mail statement 30 is formed at the processing step 45p. At this time, the value of the state field 30f becomes "5", which implies "output of result list". When the list of the job execution result is transferred as the mail statement to the electronic mail system 2, this mail statement 30 is once stored into the mail box 10 of the electronic mail system 2.

A format of this storage is represented in FIG. 5. For instance, the mail statement 32b corresponds to the list of the job execution results for the relevant user. As a consequence, the user of the electronic mail system may display the job execution results on the display screen 333 of the electronic mail terminal 5, and also may store them into the file devices 20B and 20C connected to the electronic mail system.

In the above-described processing steps 45f and 45m, after the list of the job execution results for the relevant user has been derived from the spool file 8, this list is stored into the output file 20A. Alternatively, it is possible to omit the above-described processing operation, and to immediately advance to the subsequent processing operation.

FIG. 13 represents a processing flow of the reception report processing program of the electronic mail system 2. When the control operation is transferred from the electronic mail engine 15, a check is done as to whether or not the electronic mail from the user is received at a processing step 16a. When the electronic mail from the user is received, processing operations defined from a processing step 16b to a processing step 16d are executed. At the processing step 16b, the message data 32a of the mail statement is extracted from the mail box 10 shown in FIG. 5. Next, the message data 29 (see FIG. 2) is accomplished, and the resultant message data is sent as the mail statement to the computer system 1. On the other hand, when a judgement is made at the judgement processing step 16a that the electronic mail issued not from the user of the electronic mail system is received, namely when the mail statement issued from the computer system 1 is received, the mail statement 30 of the job execution condition received at the processing step 16e is once stored into the mail box 10. At the next judgement processing step 16f, the value of the report field 30b shown in FIG. 4 is checked. If the value of this report field 30b becomes "0", namely, no report is required, the processing operation is completed.

Figure 14:
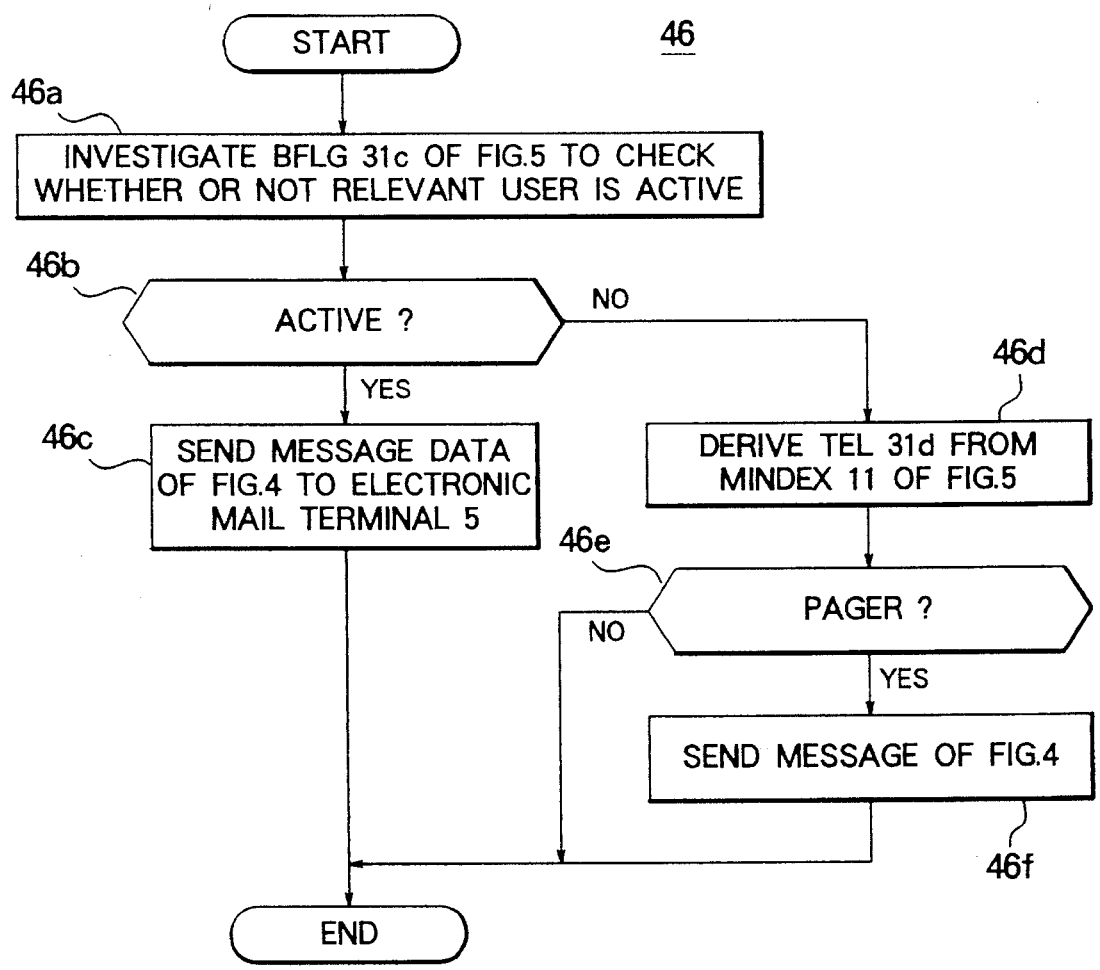
FIG. 14 is a flow chart for explaining a processing operation of a report program shown in FIG. 13.

On the other hand, when the value of the report field 30b becomes "1", namely a report is required, the control operation is transferred to the report processing program 46. FIG. 14 indicates a processing flow of the report processing program 46. At a processing step 46a, a check is performed as to whether or not, this electronic mail system 2 is under user by the user. This is accomplished by checking the content of BFLG 31c of FIG. 5. When the user is active, namely the value of BFLG 31c of this user becomes "1" at the judgement processing step 46b, the data shown in FIG. 4 is transferred to the electronic mail terminal 5 at the processing step 46c. As a result, a summary of the job execution ending condition is displayed on the specific region 34 on the display screen of the electronic mail terminal 5.

To the contrary, when the electronic mail system 2 is not under use by this user, processing operations defined from a processing step 46d to a processing step 46f are executed. That is, the telephone number TEL 31d of the relevant user is derived at the processing step 46d to establish a telephone communication. As a result, a communication is established to either the telephone receiver, or the pager. When the communication is made with the pager, the content of the mail statement shown in FIG. 4 is subsequently transferred to this pager. When the telephone number registered in the telephone number TEL 31d corresponds to the facsimile device, the content of the mail statement is sent to this facsimile device.

EMBODIMENT 2

In an electronic mail associated type computer system according to an embodiment 2 of the present invention, the computer system 1 is directly connected to the public telephone network 4 by an exclusive line means in addition to the arrangement of the previous embodiment shown in FIG. 1. With this featured arrangement, a job execution list processed in the computer system 1 may be directly outputted to the electronic mail terminal 5, or the output device 18B, 19, 20C and so on without passing through the electronic mail system 2. In accordance with such a featured arrangement of this embodiment 2, a large amount of data any be outputted to a desirable output device without giving any load on the electronic mail system 2. In other words, after a designation is made via the electronic mail system 2, of the output for the job execution result, the mail processing 13 may directly output the execution result list via the line 27 to a desired output device such as the facsimile device 19.

EMBODIMENT 3

Figure 15:
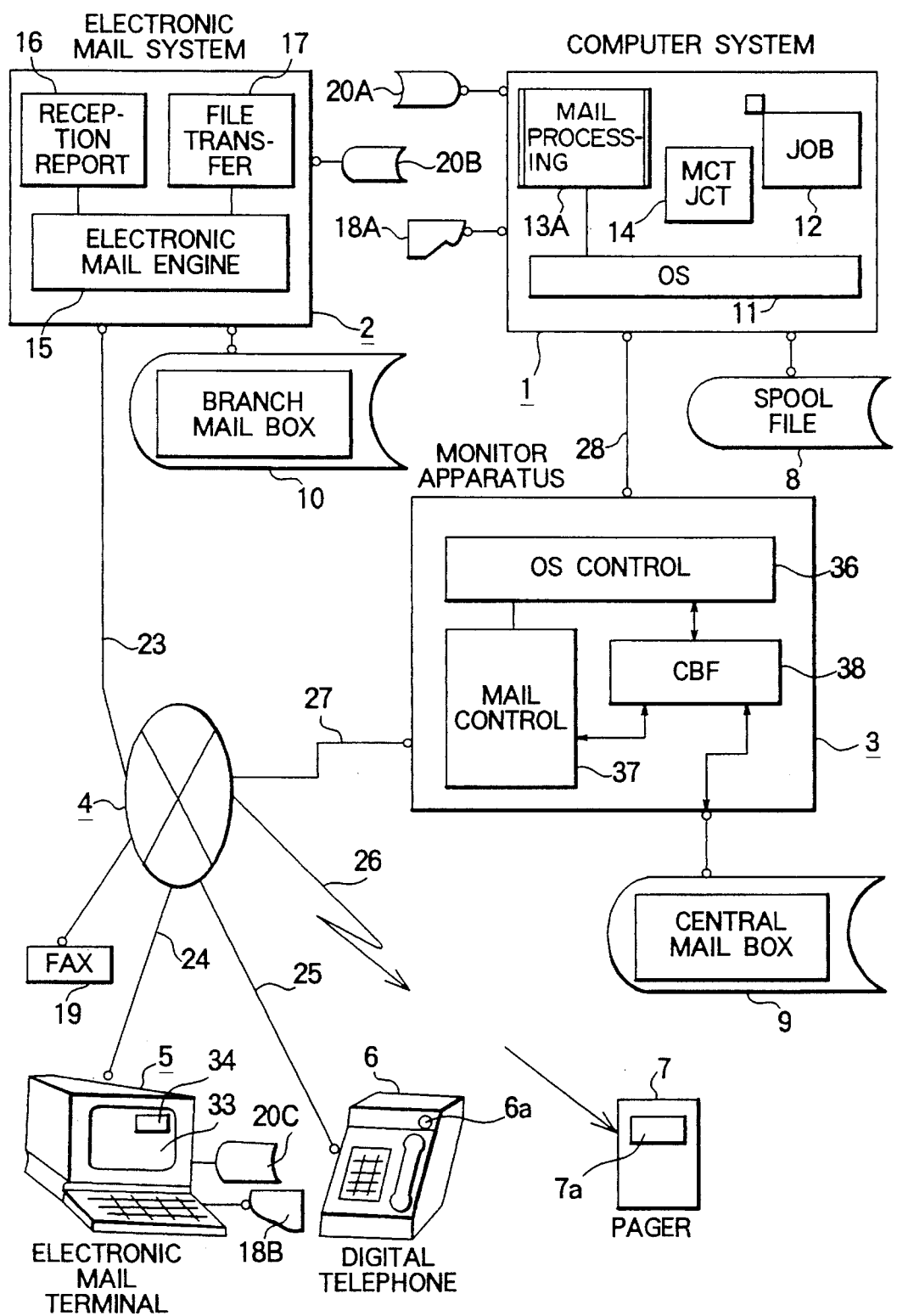
FIG. 15 schematically shows an arrangement of an electronic mail associated type computer system according to another embodiment of the present invention.

In a third embodiment of the present invention, as illustrated in FIG. 15, a monitor apparatus 3 is physically and logically provided between the electronic mail system 2 and the computer system 1. The monitor apparatus 3 is comprised of an OS (operating system) control unit 36, a mail control program 37, and a communication buffer CBF 38. The job request mail statement 29 issued from the electronic mail system 2 is transferred via the line 23 and the line 27 to the monitor apparatus 3, and then is temporarily stored into a central mail box 9 of the monitor apparatus 3. It should be noted that a structure of this central mail box 9 may be the same as that of the mail box (branch mail box) 10 of the electronic mail system 2. Subsequently, this mail statement 29 is transferred from the monitor apparatus 3 via the line 28 to the computer system 1, and then is processed under control of the mail processing program 13A having the interface function. A series of processing operations, defined from a job reception until a job execution is completed according to the third embodiment, is similar to those of the first embodiment.

When the processing operation of the job execution is completed in the computer system 1, a report representative of ending of the job execution is issued from the computer system 1 to the monitor apparatus 3. As to this reporting method, such a report may be made by processing the mail processing program 13A in accordance with the previously explained manner. Otherwise, such a report may be made by continuously monitoring the job group executed by the computer system 1 by way of the monitoring apparatus 3. Furthermore, a report may be issued for the computer system 1 to the monitor apparatus 3 only when the job execution is completed. Upon receipt of such a report that the job execution is completed from the computer system 1, the monitor apparatus 3 forms the job execution state mail statement 30 as indicated in FIG. 4, and then sends this mail statement to the electronic mail system 2. Thereafter, an operation similar to that of the first embodiment is performed.

Since the monitor apparatus 3 is interposed between the computer system 1 and the electronic mail system 2, as described above, even when the operation of the computer system 1 is interrupted during holidays according to a schedule, the user of the electronic mail system can confirm the execution conditions of the job at any time. In case that a plurality of electronic mail systems 2 are coupled to this system, the above-explained monitor apparatus 3 may collect and distribute mail statements sent from the respective electronic mail systems. The monitor apparatus may own a communication managing function effected between the electronic mail system and the computer system. As a consequence, if this monitor apparatus has such a function of electronic mail processing/management of the computer system, the conventional computer system could execute the mail job without modifying or updating the OS (operating system).

Figure 16:
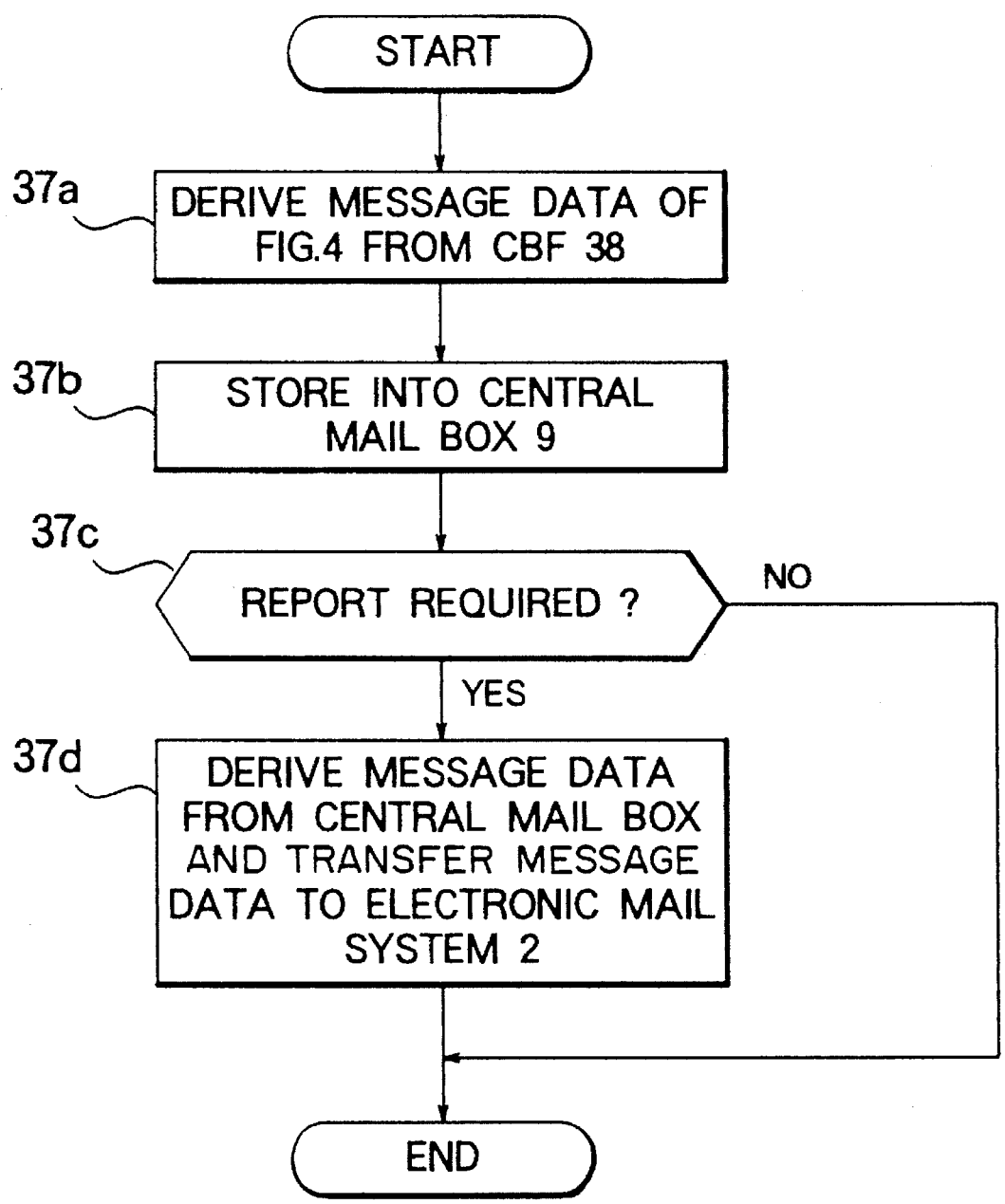
FIG. 16 is a flow chart for explaining a processing operation executed when a mail statement is supplied from the computer system of FIG. 15.

Next, a description will now be made of a processing operation of the mail control processing program 37 employed in the monitor apparatus 3. FIG. 16 represents a processing flow effected when the job-execution-state mail statement 30 is delivered from the computer system 1, and FIG. 17 shows a processing flow performed when the job request mail statement 29 is delivered from the electronic mail system 2.

In the processing flow of FIG. 16, the message data of the mail statement 30 is derived from the communication buffer CBF 38 at a processing step 37a. At the next processing step 27b, this mail statement 30 is once stored into the central mail box 9. Then, a check is done as to the value of the report field 30b of this mail statement 30 at a processing step 37c. If a report is required (namely, value of report field is "1"), the message data is derived from the central mail box 9 and then is transferred to the electronic mail system 1.

Figure 17:
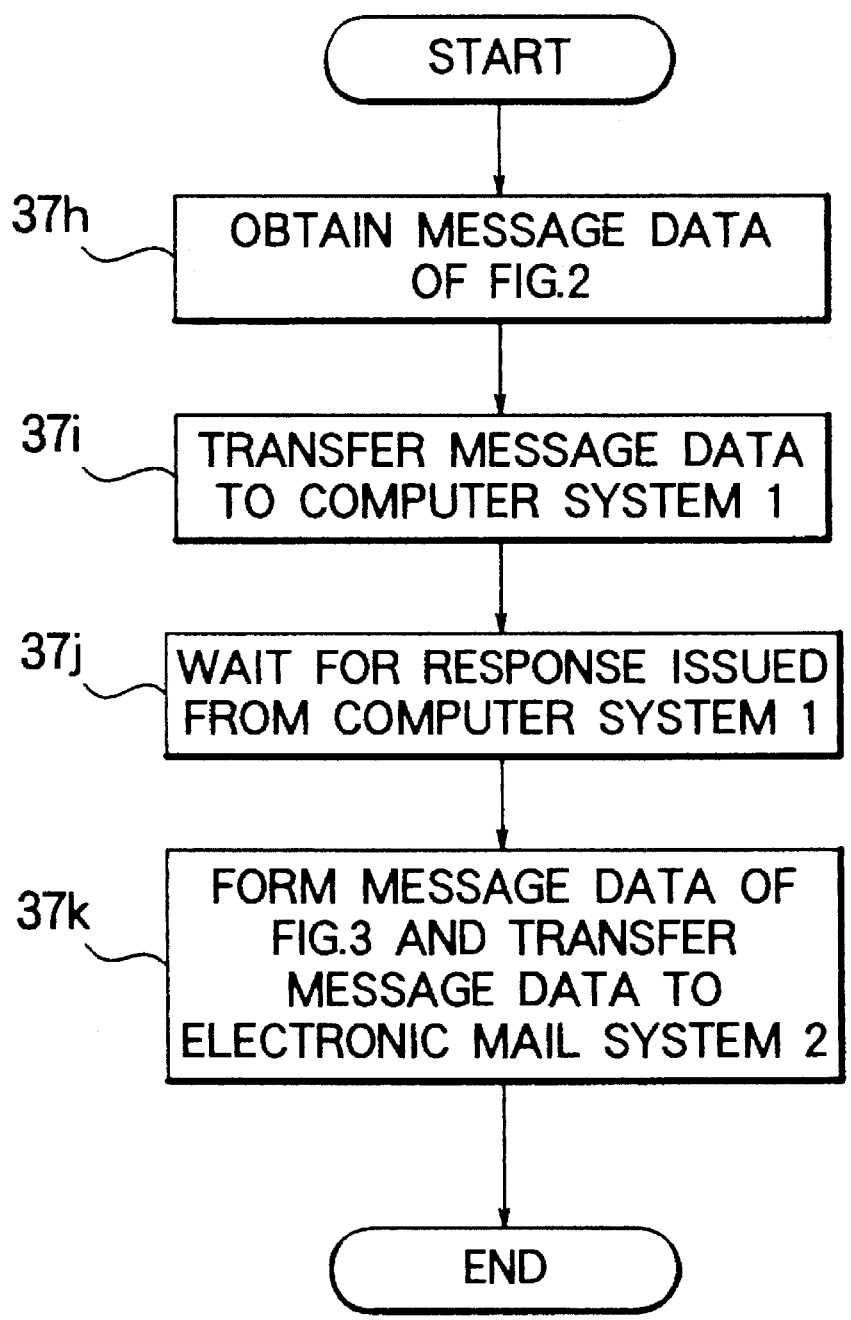
FIG. 17 is a flow chart for explaining a processing operation executed when a mail statement is supplied from the electronic mail system of FIG. 15.

A processing operation performed when the job request mail statement 29 is received from the electronic mail system 1, is illustrated by the processing flow of FIG. 17. First, at a processing step 37h, the message data of the mail statement 29 (FIG. 2) is obtained. At the subsequent processing step 37i, this message data is sent to the computer system 1. As a result, the same processing operation as that of the first embodiment is performed in the mail processing unit 13A employed within the computer system 1. At a further processing step 37j, the mail processing unit 13A waits for a response issued from the computer system. The message data of the mail statement 30 shown in FIG. 4 is sent from the computer system. At this time, the value of the state field of becomes "1", which implies "job reception". At the next processing step 37k, the message data is transferred as the mail statement 30 to the electronic mail system 2. It should be noted that when there are plural electronic mail systems 2, this monitor apparatus 3 relays the message data among these electronic mail system groups and the computer system 1. In other words, this monitor apparatus 3 performs a function of a main station among the respective electronic mail systems, so that the processing operations of the mail exchanges among these electronic mail systems and the computer system are shared by the monitor apparatus 3.

EMBODIMENT 4

Figure 18:
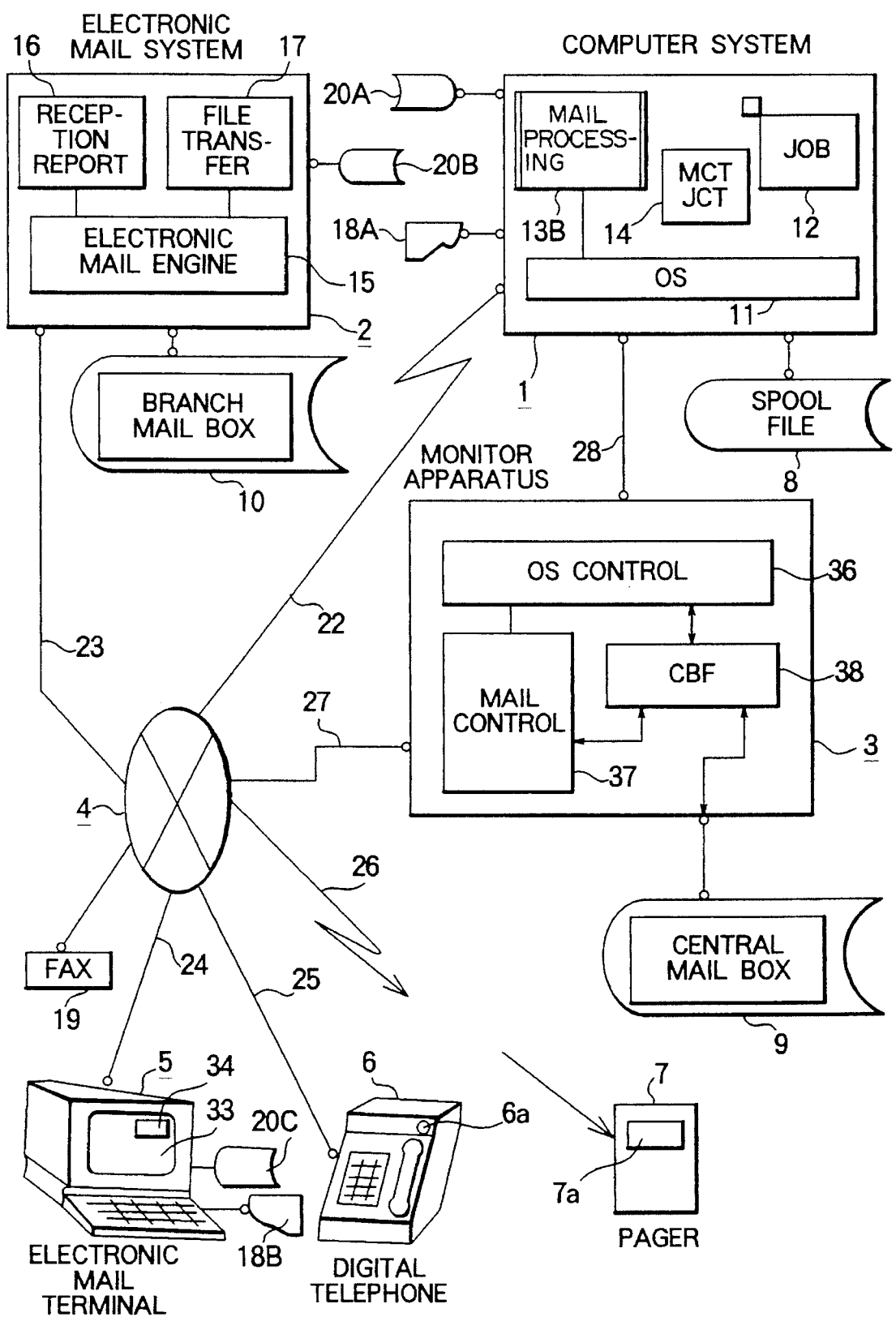
FIG. 18 schematically shows an arrangement of an electronic mail associated type computer system according to a further embodiment of the present invention.

An electronic mail associated type computer system according to a fourth embodiment of the present invention has the following different point, as compared with the third embodiment shown in FIG. 15. That is, as shown in FIG. 18, a line 22 is provided to connect the computer system 1 and the public telephone network 4. In accordance with this embodiment, a list of job execution result obtained in the computer system 1 may be directly transmitted to either the electronic mail terminal, or the output devices designated by a user, thereby outputting this list thereon.

As apparent from the above-described various embodiments according to the present invention, the user of the electronic mail system can automatically recognize such a condition by the computer system is accomplished by way of his or her own electronic mail terminal device, and also can immediately obtain the list of the job execution results. Also, the user can readily recognize the intermediate conditions of the job under execution.

As previously described, according to the present invention, since the user of the electronic mail system can arbitrarily designate the delivery destination of the job execution result in the job request mail statement, the job execution result of this user can be immediately outputted either via the electronic mail system, or without such an electronic mail system to a desired output device when the requested job to be performed by the computer system is accomplished.

Since the completion of the job execution is automatically reported to the designated output device and also the result of this job execution, namely fail or safe can be recognized by the user who is located any where no TSS line is connected, the user can immediately recognize the completion of the job execution in the computer system, and also immediately obtain the job execution result. As a consequence, there is a merit that utilization of the computer system can be further improved. The user can grasp the completion of the job executions in conjunction with the results of the job executions, i.e., fail or safe. As a consequence, only the result of job executed under normal condition is required, so that no excessive loads are given to the communication means and the memory employed in the electronic mail system. There is another merit that a command to check conditions is no longer required by entering it through the conventional TSS terminal and the like.

The computer system coupled to the electronic mail system may execute a large number of jobs requested by the users who utilize this electronic mail system when the own processing load becomes light, and then may automatically output the summary of the execution results, if required, to the designated output device. The computer system according to the present invention is especially suitable to such a delayed data processing system that, for instance, batched processing for a large amount of data is carried out not in a real time mode.

What is claimed is:

1. A job transfer method in an electronic mail associated type computer system comprising a computer system for executing a job, an electronic mail system for delivering a document, a plurality of output devices connected to said computer system and said electronic mail system, and a monitor apparatus connected between said computer system and said electronic mail system;

said job transfer method comprising the steps of:

requesting an execution of said job by a first mail from the electronic mail system to the computer system by relaying said monitor apparatus;

monitoring said job executed in the computer system by said monitor apparatus;

storing an execution result of said job into a memory device of the computer system when the job execution by the computer system is completed;

reporting an ending condition of said job from said computer system to said electronic mail system which has requested to execute the job;

transmitting and receiving a mail statement about said ending condition of the job and a mail for requesting to output an execution result of the job corresponding to said mail statement between said computer system and said electronic mail system which has requested to execute the job by relaying said monitor apparatus;

instructing a request to output the result of said job execution by a second mail from said electronic mail system which has received the report about the ending condition of the job; and transferring the result of said job execution stored in the memory device to at least one of said plural output devices based upon said output instruction.

2. A job transfer method according to claim 1, further comprising the step of sending query mail from a mail terminal, before requesting to output an execution result of the job, to obtain status information of the job so that a user can determine whether to request the execution result.

3. A job transfer method according to claim 1, wherein the first mail and the second mail are sent from a mail terminal connected to the electronic mail system.

4. A job transfer method in an electronic mail associated type computer system comprising a computer system for executing a job, an electronic mail system for delivering a document, a plurality of output devices connected to said computer system and said electronic mail system, and communication line for connecting said computer system, said electronic mail system, and said plural output devices, said job transfer method comprising the steps of:

requesting the computer system to execute the job by a first mail from the electronic mail system via the communication line;

storing an execution result of the job into a memory device of the computer system when the job execution by the computer system is accomplished;

reporting a completion of said job execution from the computer system to the electronic mail system which has requested to execute the job;

instructing a request to output the result of said job execution by a second mail from said electronic mail system which has received the report about an ending condition of said job; and transferring the result of said job execution stored in the memory device to at least one of said plural output devices based upon said output instruction.

5. A job transfer method in an electronic mail associated type computer system as claimed in claim 4, wherein said step for outputting said job execution result in response to the request for outputting the job execution result from said electronic mail system, further comprises the step of:

deriving the relevant job execution result from a spool file of the overall computer system among said job execution results, and immediately sending the derived job execution result to said output device.

6. A job transfer method in an electronic mail associated type computer system as claimed in claim 4, wherein said report about the end condition of said job contains information about a normal end of said job execution and an abnormal end of said job execution.

7. A job transfer method in an electronic mail associated type computer system as claimed in claim 4, wherein said step for outputting said job execution result in response to the output destination instruction issued from a user of said electronic mail system which has received the report about the completion condition of said job execution, further comprises the steps of:

transmitting said job execution result as a mail statement from said computer system to said electronic mail system;

storing said job execution result into a mail box within said electronic mail system; and storing said job execution result into a file connected to a mail terminal of said electronic mail system.

8. A job transfer method in an electronic mail associated type computer system as claimed in claim 4, wherein said step for outputting said job execution result in response to the instruction to output the job execution result derived from the electronic mail system which has received the report about the completion condition of said job execution, further comprises the step of:

directly outputting said job execution result from said computer system via the communication line to an electronic mail terminal unit of said electronic mail system.

9. A job transfer method in an electronic mail associated type computer system as claimed in claim 4, wherein said step for outputting said job execution result in response to the request for outputting the job execution result from said electronic mail system, further comprises the step of:

outputting said job execution result to the output device connected to said computer system.

10. A job transfer method according to claim 4, wherein the first mail and the second mail are sent from a mail terminal connected to the electronic mail system.

11. A job transfer method in an electronic mail associated type computer system comprising a computer system for executing a job, an electronic mail system for delivering a document, a plurality of output devices connected to said computer system and said electronic mail system, and a monitor apparatus connected between said computer system and said electronic mail system, said job transfer method comprising the steps of:

requesting an execution of said job by a first mail from the electronic mail system to the computer system by relaying said monitor apparatus;

monitoring said job executed in the computer system by said monitor apparatus;

storing an execution result of said job into a memory device of the computer system when the job execution by the computer system is completed;

transmitting and receiving a mail statement about a completion of the job execution and a mail for requesting to output an execution result of the job corresponding to said mail statement between said computer system and said electronic mail system which has requested to execute the job by relaying said monitor apparatus;

designating at least one of said plural output devices as output destination by a second mail from said electronic mail system which has received the report about the completion of said job execution; and transferring said result of the job execution stored in said memory device to said designated output device based on said output designation.

12. A job transfer method according to claim 11, further comprising the step of sending query mail from a mail terminal, before requesting to output an execution result of the job, to obtain status information of the job so that a user can determine whether to request the execution result.

13. A job transfer method according to claim 11, wherein the first mail and the second mail are sent from a mail terminal connected to the electronic mail system.

14. A job transfer method in an electronic mail associated type computer system comprising a computer system for executing a job, an electronic mail system for delivering a document, a plurality of output devices connected to said computer system and said electronic mail system, and a communication line for connecting said computer system, said electronic mail system, and said plural output devices, said job transfer method comprising the steps of:
requesting the computer system to execute the job by a first mail from the electronic mail system via the communication line;
storing an execution result of the job into a memory device of the computer system when the job execution by the computer system is accomplished;
reporting a completion of said job execution from the computer system to the electronic mail system which has requested to execute the job;
designating at least one of said plural output devices as output destination by a second mail from said electronic mail system which has received the report about the completion of said job execution; and
transferring said result of the job execution stored in said memory device to said designated output device based on said output designation.

15. A job transfer method in an electronic mail associated type computer system as claimed in claim 14, wherein said step for outputting said job execution result in response to the output destination instruction issued from a user of said electronic mail system which has received the report about the completion of said job execution, further comprises the steps of:
transmitting said job execution result as a mail statement from said computer system to said electronic mail system;
storing said job execution result into a mail box within said electronic mail system; and
storing said job execution result into a file connected to a mail terminal of said electronic mail system.

16. A job transfer method in an electronic mail associated type computer system as claimed in claim 14, wherein said step for outputting said job execution result in response to the request for outputting the job execution result from said electronic mail system, further comprises the step of:
outputting said job execution result to the output device connected to said computer system.

17. A job transfer method according to claim 14, wherein the first mail and the second mail are sent from a mail terminal connected to the electronic mail system.

18. A job transfer method in an electronic mail associated type computer system comprising a computer system for executing a job, an electronic mail system for delivering a document, a plurality of output devices connected to said computer system and said electronic mail system, and a monitor apparatus connected between said computer system and said electronic mail system, said job transfer method comprising the steps of:
requesting an execution of said job by a first mail from the electronic mail system to the computer system by relaying said monitor apparatus;
monitoring said job executed in the computer system by said monitor apparatus;
storing an execution result of said job into a memory device of the computer system when the job execution by the computer system is completed;
transmitting and receiving a mail statement about the completion of the job execution and a mail for requesting to output an execution result of the job corresponding to said mail statement between said computer system and said electronic mail system which has requested to execute the job by relaying said monitor apparatus; and
transferring said execution result of the job stored into said memory device to the designated output device among said plurality of output devices based upon an output designation made by a second mail from the electronic mail system which has received the report about the completion of said job execution.

19. A job transfer method according to claim 18, further comprising the step of sending query mail from a mail terminal, before requesting to output an execution result of the job, to obtain status information of the job so that a user can determine whether to request the execution result.

20. A job transfer method according to claim 18, wherein the first mail and the second mail are sent from a mail terminal connected to the electronic mail system.

21. A job transfer method in an electronic mail associated type computer system comprising a computer system for executing a job, an electronic mail system for delivering a document, a plurality of output devices connected to said computer system and said electronic mail system, and a communication line for connecting said computer system, said electronic mail system, and said plural output devices, said job transfer method comprising the steps of:
requesting the computer system to execute the job by a first mail from the electronic mail system via the communication line;
storing an execution result of the job into a memory device of the computer system when the job execution by the computer system is accomplished;
reporting a completion of said job execution from the computer system to the electronic mail system which has requested to execute the job; and
transferring said execution result of the job stored into said memory device to the designated output device among said plurality of output devices based on an output designation made by a second mail from the electronic mail system which has received the report about the completion of said job execution.

22. A job transfer method in an electronic mail associated type computer system as claimed in claim 1, wherein said step for requesting the output of the job execution result from said electronic mail system further comprises the steps of:
forming a mail statement of an output instruction containing information used to designate an output device for outputting the job execution result in said electronic mail system;
sending said mail statement to said computer system; and
outputting said job execution result to the output device designated based on the instruction of said mail statement.

23. A job transfer method in an electronic mail associated type computer system as claimed in claim 1, wherein said step for outputting said job execution result in response to the output destination instruction issued from a user of said electronic mail system which has received the report about the completion of said job execution, further comprises the steps of:

transmitting said job execution result as a mail statement from said computer system to said electronic mail system;

storing said job execution result into a mail box within said electronic mail system; and storing said job execution result into a file connected to a mail terminal of said electronic mail system.

24. A job transfer method in an electronic mail associated type computer system as claimed in claim 21, wherein said step for outputting said job execution result in response to the instruction to output the job execution result derived from the electronic mail system which has received the report about the completion of said job execution, further comprises the step of:

directly outputting said job execution result from said computer system via the communication line to an electronic mail terminal unit of said electronic mail system.

25. A job transfer method in an electronic mail associated type computer system as claimed in claim 21, wherein said step for outputting said job execution result in response to the request for outputting the job execution result from said electronic mail system, further comprises the step of:

outputting said job execution result to the output device connected to said computer system.

26. A job transfer method in an electronic mail associated type computer system as claimed in claim 21, wherein said step for outputting said job execution result in response to the request for outputting a list of the job execution results from said electronic mail system, further comprises the step of:

deriving the relevant job execution result from a spool file of the overall computer system among said job execution results, and immediately sending the derived job execution result to said output device.

27. A job transfer method in an electronic mail associated type computer system as claimed in claim 21, wherein said step for outputting said job execution result in response to the instruction to output the job execution result derived from the electronic mail system which has received the report about the completion of said job execution, further comprises the step of:

directly outputting said job execution result from said computer system via the communication line to an electronic mail terminal unit of said electronic mail system.

28. A job transfer method in an electronic mail associated type computer system as claimed in claim 21, wherein said step for outputting said job execution result in response to the request for outputting the job execution result from said electronic mail system, further comprises the step of:

deriving the relevant job execution result from a spool file of the overall computer system among said job execution results, and immediately sending the derived job execution result to said output device.

29. A job transfer method according to claim 21, wherein the first mail and the second mail are sent from a mail terminal connected to the electronic mail system.

30. An electronic mail associated type computer system comprising a computer system for executing a job, an electronic mail system for delivering a document, a plurality of output devices connected to said computer system and said electronic mail system, and a communication line for connecting said computer system, said electronic mail system, and said plural output devices; wherein said computer system includes a monitor apparatus interposed between said computer system and said electronic mail system, said monitor apparatus monitoring said job executed in said computer system, and a processing means for relaying a mail statement between said computer system and said electronic mail system;

wherein one of said plurality of output devices is selected by a first mail from the electronic mail system that is separate from a second mail used to request the job.

31. A job transfer method according to claim 30, wherein the first mail and the second mail are sent from a mail terminal connected to the electronic mail system.

32. An electronic mail associated type computer system comprising a computer system for executing a job, an electronic mail system for delivering a document, and a communication line for connecting said computer system and said electronic mail system, for requesting an execution of said job by a first mail from said electronic mail system to said computer system; wherein said computer system includes a monitor apparatus interposed between said computer system and said electronic mail system;

said monitor apparatus includes a processing means for monitoring and controlling an operation of said computer system, and a processing means for said electronic mail system; and said electronic mail associated type computer system further includes a processing means for relaying a mail statement related to said job between said electronic mail system and said computer system, and a plurality of output devices from which one output device is selected by a second mail from said electronic mail system.

33. A job transfer method according to claim 32, wherein the first mail and the second mail are sent from a mail terminal connected to the electronic mail system.

34. An electronic mail associated type computer system comprising a computer system for executing a job, a plurality of electronic mail systems for delivering documents, and a communication line for connecting them with each other, for requesting an execution of said job by a first mail from said electronic mail system to said computer system; wherein said electronic mail associated type computer system includes a monitor apparatus interposed between said computer system and said plurality of electronic mail systems;

said monitor apparatus includes a processing means for monitoring and controlling an operation of said computer system, a processing means of said electronic mail systems, and a processing means for distributing mail statements related to said job among the respective electronic mail systems and said computer system, and a plurality of output devices from which one output device is selected by a second mail from said electronic mail system.

35. A job transfer method according to claim 34, wherein the first mail and the second mail are sent from a mail terminal connected to the electronic mail system.

36. An electronic mail associated type computer system comprising a computer system for executing a job, an output device connected to said computer system, an electronic mail system for delivering a document, an electronic mail terminal, an output device connected to said electronic mail terminal, for requesting an executing of said job by a first mail from the electronic mail terminal of said electronic mail system to said computer system, wherein said electronic mail system includes:

a processing means for producing a mail statement for requesting to output a job executing a result to at least one designated output device of said plural output devices in response to a demand for obtaining said job execution result from said electronic mail terminal, and for transferring said mail statement to said computer system, wherein the mail statement is separate from the first mail; and said computer system includes a spool file for storing said job execution result, and a processing means for outputting said job execution result of said spool file to the output device designated by said mail state.

37. A job transfer method according to claim 36, wherein the first mail and the second mail are sent from a mail terminal connected to the electronic mail system.

38. An electronic mail associated type computer system comprising a computer system for executing a job according to a first mail, an electronic mail system for delivering a document, and a plurality of output devices; wherein said computer system includes:
storage means for storing data about a corresponding relationship between a user name of said computer system and a user name of said electronic mail system;
a spool file for holding said job execution result when the execution of said job executed in said computer system is completed;
retrieval means for retrieving communication destination of a user who has requested to execute the job;
report means for reporting both the completion of said job execution and a completion condition thereof to said communication destination of the user of the electronic mail system; and
means for outputting said job execution result from said spool file to said output device in response to a request for outputting said job execution result by a second mail from said electronic mail system.

39. A job transfer method according to claim 38, wherein the first mail and the second mail are sent from a mail terminal connected to the electronic mail system.

40. An electronic mail associated type computer system equipped with a computer system for executing a job according to a first mail, a plurality of electronic mail systems for delivering documents, and a plurality of output devices, comprising:

a monitor apparatus interposed among said computer system, and first and second electronic mail systems;
a spool file for holding a job execution result when the execution of the job executed in said computer system is completed; and retrieval means for retrieving a user name of said first electronic mail system, said user requesting the execution of the job within said computer system;

wherein a mail statement indicating that the execution of the job designated to said user is accomplished, is once relayed from said computer system by said monitor apparatus;

processing means where said monitor apparatus functions as a branch of said second electronic mail system;

processing means for delivering said mail statement indicative of the completion of said job execution from said second electronic mail system to said first electronic mail system;

instruction means for issuing an instruction from said monitor apparatus to said computer system, while the mail statement from said electronic mail system is received by said monitor apparatus, based upon the instruction to output said job execution result by a second mail from said first electronic mail system in response to the report about the completion of said job execution; and processing means for outputting said job execution result to the output device designated by said computer system based on said instruction.

41. A job transfer method according to claim 40, wherein the first mail and the second mail are sent from a mail terminal connected to the electronic mail system.

42. An electronic mail associated type computer system comprising a computer system for executing a job according to a first mail, a result of executing the job being stored in a storage means of the computer system and being output in response to a second mail, an electronic mail system for delivering a document, and an electronic mail terminal to said computer system, wherein said electronic mail system includes a first processing means for forming a mail statement about a check of a job execution condition from said electronic mail system in response to interrogation about the job execution condition in said computer system derived from said electronic mail terminal; and said computer system includes a second processing means for producing a condition mail statement of said job by checking said job execution condition, and for sending said condition mail to the electronic mail terminal which has requested to send the mail.

43. An electronic mail associated type computer system as claimed in claim 42, wherein said second processing means is constructed in such a manner that a selection is made of a mail statement for indicating that either said job execution is ended under normal condition, or said job execution is ended under abnormal condition, while the job of said user is executed, based upon the condition mail statement of said job and said job condition within said computer system.

44. A job transfer method according to claim 42, wherein the first mail and the second mail are sent from a mail terminal connected to the electronic mail system.

* * * * *